(12) United States Patent     (10) Patent No.: US 7,483,769 B2
Stewart     (45) Date of Patent: *Jan. 27, 2009

(54) METHOD AND APPARATUS FOR LATENT TEMPERATURE CONTROL FOR A DEVICE UNDER TEST

(75) Inventor: Robert T. Stewart, La Mesa, CA (US); Sandy Hoover, legal representative, El Cajon, CA (US)

(73) Assignee: Sigma Systems Corporation, El Cajon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/343,548

(22) Filed: Jan. 30, 2006

(65) Prior Publication Data

US 2006/0178784 A1     Aug. 10, 2006

Related U.S. Application Data

(60) Division of application No. 10/219,144, filed on Aug. 14, 2002, now Pat. No. 6,993,418, which is a continuation-in-part of application No. 09/268,900, filed on Mar. 16, 1999, now Pat. No. 6,449,534.

(51) Int. Cl.
*G06F 19/00* (2006.01)
(52) U.S. Cl. .................. 700/299; 700/153; 702/132
(58) Field of Classification Search .......... 700/229, 700/79, 205, 300, 153, 71, 202; 702/130, 702/132, 136; 236/78
See application file for complete search history.

(56) References Cited

U.S. PATENT DOCUMENTS

| | | | |
|---|---|---|---|
| 4,734,872 A | 3/1988 | Eager et al. | |
| 4,816,647 A | 3/1989 | Payne | |
| 4,925,089 A | 5/1990 | Chaparro et al. | |
| 5,197,375 A | 3/1993 | Rosenbrock et al. | |
| 5,205,132 A * | 4/1993 | Fu | 62/208 |
| 5,224,836 A | 7/1993 | Gunn et al. | |
| 5,367,601 A | 11/1994 | Hannabery | |
| 5,420,521 A | 5/1995 | Jones | |
| 6,023,985 A * | 2/2000 | Fournier | 73/865.6 |
| 6,449,534 B1 | 9/2002 | Stewart | |
| 6,487,463 B1 * | 11/2002 | Stepp, III | 700/79 |
| 6,498,899 B2 | 12/2002 | Malinoski et al. | |
| 6,577,148 B1 * | 6/2003 | DeHaven et al. | 324/765 |
| 2003/0001605 A1 * | 1/2003 | Jones et al. | 324/760 |

* cited by examiner

*Primary Examiner*—Kidest Bahta
(74) *Attorney, Agent, or Firm*—Gazdzinski & Associates

(57) ABSTRACT

A method and associated algorithm for controlling and optimizing the temperature of a device under test (DUT) through calculation of a moving setpoint which varies from the user-specified DUT core temperature. The method generally comprises (i) calculating a system operating range based on limits imposed by the DUT, associated temperature control system, and thermal conditioning equipment; (ii) determining the allowable operating range for the DUT based on permissible DUT stress and DUT core temperature; and (iii) calculating a control setpoint based on DUT and conditioning system temperature data, one or more pre-selected setup factors, and the system and DUT operating ranges. In another aspect of the invention, variable temperature differential limits are imposed on the CSP as a function of DUT core temperature in order to mitigate thermal shock to the DUT. Methods and apparatus for latent temperature control are also disclosed.

35 Claims, 16 Drawing Sheets

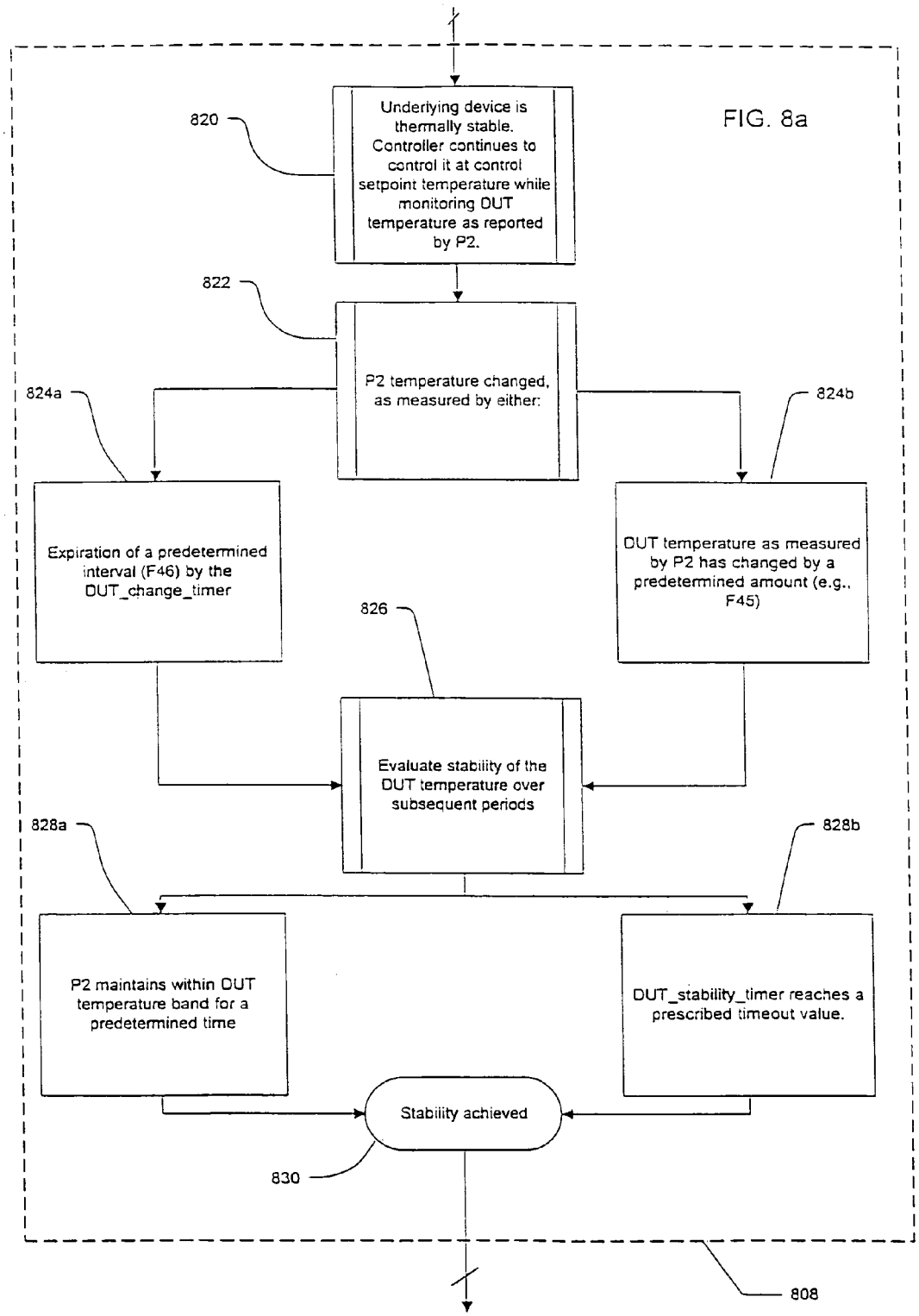

METHOD AND APPARATUS FOR LATENT TEMPERATURE CONTROL FOR A DEVICE UNDER TEST

This application is divisional of and claims priority to U.S. patent application Ser. No. 10/219,144 of the same title filed Aug. 14, 2002, now U.S. Pat. No. 6,993,418, which is a continuation-in-part of and claims priority to U.S. patent application Ser. No. 09/268,900 filed Mar. 16, 1999 and entitled "Method And Apparatus For Optimizing Environmental Temperature For A Device Under Test", now U.S. Pat. No. 6,449,534, each of which are incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention relates to temperature control in systems wherein a device under test (DUT) is thermally conditioned (heated or cooled to some thermal state) by a thermal conditioning device that adds or removes heat to/from the device by convection, conduction, or radiation. More particularly, this invention discloses a method and apparatus for dynamically determining an optimum temperature profile for the conditioning device such that the DUT is conditioned as quickly as possible without exposing either the conditioning device or the DUT to unacceptable temperatures.

2. Description of Related Technology

The nature of heat transfer is such that a differential in temperature between two masses must exist before heat will flow between them. The greater the temperature differential, the greater the heat flow will be. This phenomenon operates equally for masses that are separate but adjacent and for masses that are adjacent parts of a monolithic whole.

The rate of transfer of heat within a mass having an internal temperature differential is regulated by that substance's resistance to heat flow; its thermal conductivity. Every substance exhibits a different and predictable thermal conductivity.

It follows that to change the temperature of the center of a mass (the "core") to some desired temperature, the setpoint, the outside surface of the mass (the "skin") must be exposed to a temperature beyond the desired core temperature for a time period adequate to allow the sufficient transfer of heat given the mass thermal conductivity.

The foregoing concept is clearly illustrated by the everyday example of roasting meat within a conventional oven. The meat is roasted for a given period of time, as determined by its weight, at a comparatively high oven air temperature in order to achieve a desired lower internal or "core" temperature. The differential temperature causes heat to flow to the core of the meat, thereby raising its temperature.

As previously stated, the transfer of heat into or out of the core of a mass consumes a finite amount of time. This time has value, so there is an incentive to achieve the thermal objective (e.g., the desired core temperature) as quickly as possible. A simple solution to accelerating the heat transfer is to increase the temperature differential between the object's skin and it's core. The greater differential will result in faster heat transfer.

However, it will be appreciated that many objects to be heated or cooled have practical thermal limits that must be respected if the object is to be not damaged or destroyed by the heating or cooling process. The most common limits that must be considered are the maximum and minimum temperatures that the skin of the mass can tolerate, and the maximum skin to core temperature differential (thermal stress) that can be tolerated.

Therefore, there is a limit to the amount of heat that can be added or removed from the skin of a DUT during the heating or cooling process without exceeding the thermal limits of the object. Controlling the temperature of the skin of a DUT to that limit will allow the maximum rate of heat transfer to/from the object's core while still respecting the limits of the object's skin. If there is a thermal differential limit as well, then the skin temperature may have to be further restrained to remain within that limit.

Another factor that must be considered is the so-called "latency" of the heating or cooling process. As discussed in greater detail below, if the skin of a DUT is subjected to a more extreme temperature than that desired in the object's core until such time as the core achieves the desired temperature, then the core will be at the desired temperature but the skin will be at a more extreme temperature with the mass between the two areas having a temperature gradient therebetween. If no more heat is added or removed, the entire mass will then equalize in temperature over time. The equalized temperature will be more extreme than the core temperature desired.

Referring again to the example of roasting meat, if a given internal or core temperature is desired, and the meat is roasted at a higher temperature than the desired core temperature, the oven may be turned off when the core temperature has reached a value somewhat less than the desired value. After the oven is turned off, the core temperature will climb to the desired value while the skin region transfers the last of its excess heat to the core in the process of thermal equalization. It should be noted, however, that while this approach may be useful in roasting meat where the allowable tolerances are comparatively high, it is not useful in most thermal conditioning applications having more limited allowable tolerances, and where there is generally little experiential basis for the applying the technique.

To change the core temperature of a DUT undergoing conditioning, the skin of the object is typically exposed to a conductive or convective controlled temperature mass that transfers heat to/from the skin. It is the temperature of this external mass that must be controlled to achieve the desired heat transfer to/from the core of the object. Due to the thermal conductivity and mass of the object there is often substantial thermal latency in the transfer process. One reliable way to achieve the desired core temperature without "overshooting", is to regulate the skin's thermal environment such that as the object's core approaches the desired temperature the object's skin temperature is forced to approach the same temperature. As the desired temperature is reached, the temperature difference between the core region and skin region approaches zero and heat transfer effectively ceases. See FIG. 1, which illustrates the response of an exemplary prior art thermal conditioning system.

The typical prior art method used for achieving this type of convergent control is to measure the temperature of the thermal environment that acts upon the object's skin and also measure the temperature of the DUTs core. When determining whether to add or remove heat from the thermal environment, it is the average of the two temperatures that is compared to the temperature objective to make the determination. Thus, the environment will be thermally over-driven by the amount the DUTs core varies from the desired temperature. As the DUTs core approaches the desired temperature, the average of the two temperatures will require that the DUTs environment approach the desired core temperature at the same rate.

The temperature averaging method described above has the substantial disadvantage that it has no method for respecting the thermal limitations of the device in which the thermal environment is created, nor does it respect the thermal limits of the DUT being conditioned. It is quite possible for the averaging method to call for additional heating/cooling when either the skin of the device being conditioned, or the conditioning device itself is already at or beyond its limits. Substantial damage to property and risk to operators results from the unrestrained use of such averaging methods.

Therefore, to make effective use of this type of averaging method, it is imperative that the output from the control system that is using the average temperature to call for heating or cooling be restrained if that output calls for the addition or removal of heat in a manner that would cause the limits of the thermal conditioning device, or the DUT, to be exceeded. If the temperature control system is a simple "on/off" thermostat type control, externally restraining the control system output will be satisfactory. However, if the control method being used is a more sophisticated method designed around a closed feedback loop that allows the control system to adapt or modify its control output based upon the results of its prior operation, then the external restraining of the control outputs can be disastrous.

Almost all precision temperature control systems involve a method that uses process result feedback in some type of closed loop to adaptively regulate temperature while adjusting for the thermal response of the environment/device being controlled. Using the feedback data, the controller compares the setpoint to the results observed in the feedback data in order to increase or decrease the controller's output to better achieve the setpoint in the process. The feedback loop, and the analysis of the feedback data over time, is the essence of closed loop temperature process control. Feedback data enables the controller to determine the error in the process control, where error is defined as the difference between the setpoint and actual process temperature at points in time. While there are a multiplicity of control algorithms in use, all generally rely either on periodic error comparison and integration or on periodic comparison of feedback data with expected results data, or on some combination of these. It is the periodic nature of these routines that allows the controller to adjust the level of output.

It is therefore clear that any system that uses such a control method would suffer substantially if its output was externally restrained or "clipped," since the external clipping of the output would result in substantial variation to the result of the control system's output. To tolerate this kind of modification of the output signal by an external system, the primary control system would have to be fed accurate data as to the magnitude and timing of the clipping. It is an important component of all but the most sophisticated of these closed loop routines that the feedback data be reasonably current. That is, the feedback results most recently obtained are used to adjust the current controller output, thus making the presumption that the control result seen in that data was related to recent output. Additionally, if there is substantial latency in the path from controller output to data feedback, and especially if there are combinations of components with widely varying thermal time constants within the path that provides the feedback data, then the controller receiving the feedback data is deprived of the regular and periodic nature of such data that is requisite for control. Such latency may occur for example when an assembly of items is stacked on a thermal platform, wherein each component of the stack provides significant thermal transmission latency, and wherein each may have a different thermal latency. Upon the top of the stack resides the DUT of interest. Another situation where such latency may occur is that of a large mass DUT which is thermally conditioned by a fluid conditioning system to which the DUT is connected. Hoses or pipes pass the conditioning medium (e.g., fluid or refrigerant) which flows between the DUT and the conditioning unit.

Often, it is possible to obtain temperature feedback data from the underlying platform or thermal conditioning system to control the temperature of the underlying system. However, such control does not compensate for heat gains and losses in the path between the DUT and the controlled device. Controlling the underlying device can provide a stable thermal environment, but seldom will it result in the correct DUT temperature. On the other hand, if the feedback is obtained from the DUT, the thermal latency of the system will result in over driving of the controller outputs that will create an unacceptable controlled temperature oscillation.

Based on the foregoing, an improved method and apparatus for allowing stable control of a significantly latent DUT at the correct stable temperature is needed. Such improved method and apparatus would ideally maintain a stable temperature for the DUT without significant temperature oscillations or hunting.

SUMMARY OF THE INVENTION

The present invention satisfies the aforementioned needs by providing an improved temperature control method and apparatus useful in the thermal conditioning of devices.

In a first aspect of the invention, an improved method of controlling the temperature of an object using a temperature control system is disclosed. The method generally comprises: providing data related to the temperature of the object; determining the allowable operating range of the temperature control system; determining the allowable operating range associated with the object based at least in part on the data; calculating a control setpoint based at least in part on the allowable operating ranges of the temperature control system and the object; and providing the control setpoint to the temperature control system in order to control the temperature of the object. In one embodiment, a system operating range (SOR) and DUT operating range (DOR) are calculated based on the thermal and stress limits of the DUT, temperature control system (TCS), and thermal conditioning apparatus. A control setpoint (CSP) which is different than the desired DUT core temperature specified by the user (i.e., the PSP) is then calculated based on the difference between the PSP and the secondary temperature sensing probe input temperature, the value of two predetermined setup parameters, and the relationship between the SOR and DOR, so as to effectuate varying amounts of heat transfer between the thermal conditioning environment and the DUT. As the desired DUT core temperature is approached, movement of the control setpoint is terminated and the differential between core and skin temperature of the DUT reduced accordingly until the user-specified setpoint is reached.

In a second aspect of the invention, a device thermally conditioned using the aforementioned method is disclosed.

In a third aspect of the invention, an algorithm incorporating the method described above is disclosed. In one exemplary embodiment, the computer program is compiled into an object code format which is stored on a magnetic storage medium, and which is capable of being run on a digital computer processor. The algorithm receives inputs (via the host computer system, described below) from instrumentation associated with the thermal conditioning system, such as chamber/device temperature probes, and calculates the Control Setpoint (CSP) which is fed back to the thermal conditioning system to effectuate control of the chamber and device temperature.

In a fourth aspect of the invention, an improved method and algorithm for controlling the temperature differential limits of a device under test (DUT) are disclosed. Specifically, variable differential thermal limits are employed as a function of the core temperature of the DUT in order to control thermal shock to the DUT during various temperature transitions.

In a fifth aspect of the invention, a computer system incorporating the computer program previously described is disclosed. In one embodiment, the computer system comprises a standard microcomputer (personal computer) having a display, magnetic disk drive, microprocessor, internal memory, and input/output port for receiving and transmitting data to and from the computer. The aforementioned computer program is loaded into the internal memory from the storage area and run by the microprocessor to effect temperature control of the DUT. In a second embodiment, a digital processor is integrated with the temperature control system, the above-described computer program being stored within the memory or storage device associated with the processor/TCS.

In a sixth aspect, a thermal conditioning system is disclosed which incorporates the method, computer program, and computer system previously described. In one embodiment, a TCS is operatively coupled to a thermal conditioning chamber having a plurality of temperature probes for measuring the temperature of the conditioning environment as well as that of the DUT. The TCS may be of any compatible configuration including the PID or fuzzy logic types. The computer system previously described is operatively coupled to the TCS, whereby the former receives temperature data and other relevant inputs from the latter, and periodically calculates and provides a control setpoint (CSP) value thereto for control of the thermal conditioning chamber.

In a seventh aspect of the invention, an improved method of achieving a desired temperature of a first object using a second object is disclosed. In one embodiment, the first and second objects are in direct or indirect physical contact, the second object being adapted both to provide heating and cooling, and the method comprises: controlling and monitoring the temperature of the second object to achieve a first temperature thereof, observing at least one event associated with the first object after the second object has achieved the first temperature; and subsequently controlling the temperature of the second object based at least in part on the at least one event.

In an eighth aspect of the invention, a method of latently achieving a desired temperature of a DUT using a temperature conditioning element is disclosed. In one embodiment, the DUT and temperature conditioning element are able to pass thermal energy therebetween, and the method comprises: monitoring the temperature of the conditioning element using a first temperature probe; controlling the temperature of the conditioning element based at least in part on the act of monitoring, the controlling achieving and maintaining for at least a period of time a target temperature of the element; observing, using a second temperature probe, a temperature change event and a subsequent temperature stabilization event within the DUT after the conditioning element has substantially achieved the target temperature; and subsequently controlling the temperature of the conditioning element for at least a period of time based at least in part on the change and stabilization events.

In a ninth aspect of the invention, a method of controlling the temperature of a conditioning device is disclosed. In one embodiment, the method comprises: generating first signals from a first temperature probe, the first signals related to the temperature of at least a portion of a DUT; generating second signals from a second temperature probe, the second signals related to the temperature of at least a portion of the conditioning device; establishing a first temperature for the conditioning device; identifying at least one change in the DUT thereafter; identifying at least one stabilization event in the DUT thereafter; and adjusting the temperature of the conditioning device based at least in part on the first and second signals and the acts of identifying.

In another embodiment, the method of controlling the temperature of a conditioning device comprises: generating first signals from a first probe, the first signals related to a parameter of a DUT; generating second signals from a second temperature probe, the second signals related to the temperature of at least a portion of the conditioning device; establishing a first temperature for the conditioning device; identifying at least one change in the DUT thereafter; identifying at least one stabilization event in the DUT thereafter; and adjusting the temperature of the conditioning device based at least in part on the first and second signals and the acts of identifying.

BRIEF DESCRIPTION OF THE DRAWINGS

FIG. 8a is a logical flow diagram illustrating specific aspects of the method of FIG. 8.

DETAILED DESCRIPTION OF THE INVENTION

Reference is now made to the drawings wherein like numerals refer to like parts throughout.

As used herein, the terms "thermally condition" and "conditioned" shall refer broadly to activities wherein one or more DUTs are thermally treated, evaluated, or otherwise exposed to thermally controlled environments for whatever reason, including without limitation thermally "baking" an object according to a time/temperature profile, testing a DUT under varying thermal conditions or extremes, and evaluating the mechanical or electrical properties of a DUT.

Figure 2:
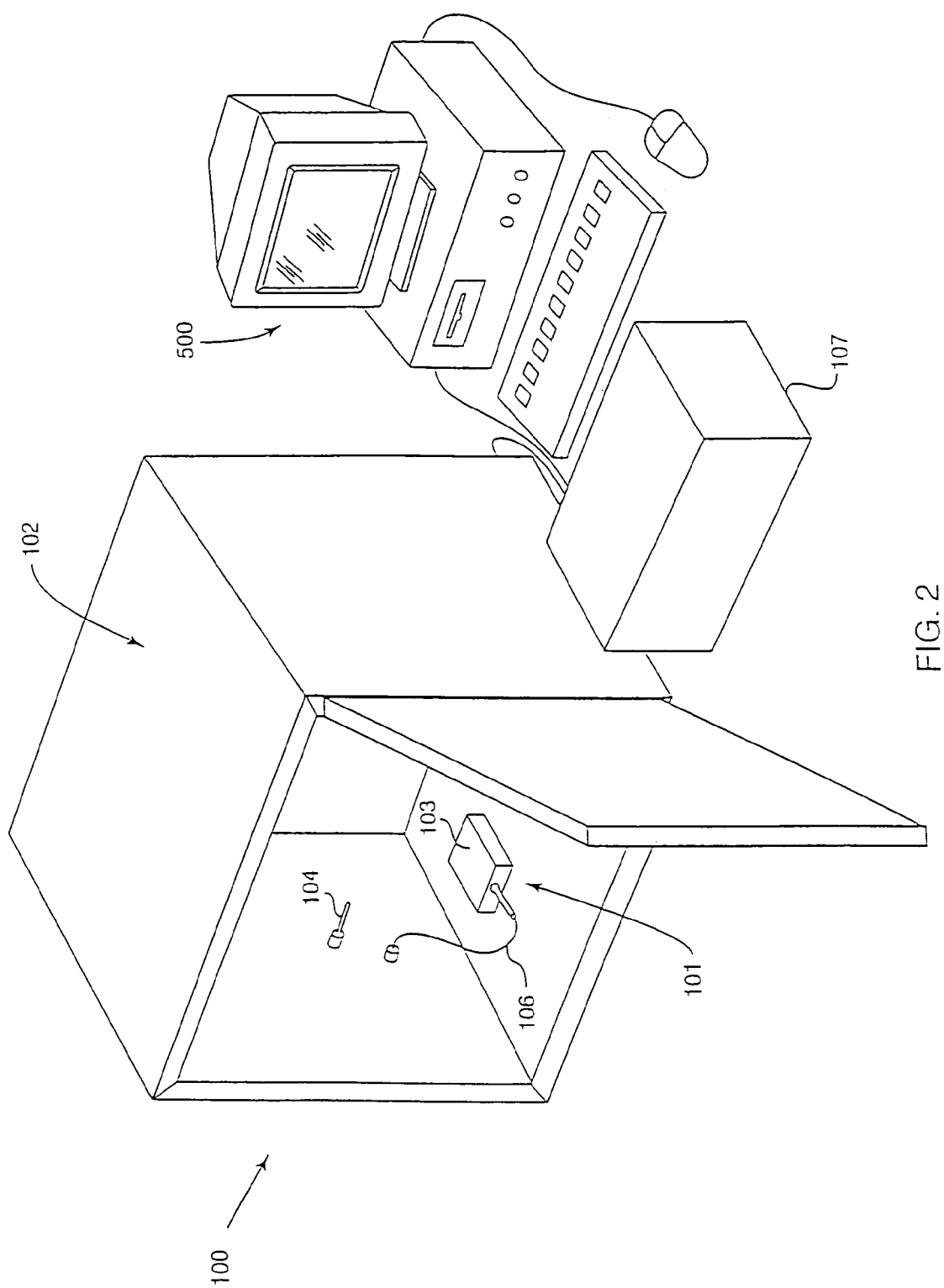
FIG. 2 is a perspective view of a DUT located within a thermal conditioning chamber (oven).

FIG. 2 illustrates an exemplary thermal conditioning system 100 as used in conjunction with the invention disclosed herein. Further shown in FIG. 2 is a so-called "device under test" (DUT) 101, which is thermally tested or conditioned by the system 100, having generally an outer or "skin" region 103, and an internal or "core" region (not shown). For the purposes of this disclosure, the internal temperature of the DUT 101 will be referred to as the "core" temperature, and the outside surface temperature of the DUT will be referred to as the "skin" temperature. Note that the term "core" does not suggest that that the interior of the DUT be necessarily defined by some required unique core material that is differentiated from the surrounding material, although such a differentiation is none-the-less compatible with the present invention. Likewise, the term "skin" does not suggest that the exterior region or surface of the DUT is necessarily defined by some required unique material that is differentiated from the substance interior to it. Rather, these terms merely define the relative thermal positions on or within the DUT.

For convective environments, such as that existing within the thermal conditioning oven of FIG. 2, the skin 103 is that portion of the exterior region of the DUT that is exposed to the convective fluid which is typically, but not necessarily, air.

For conductive environments, such as a thermal platform, the skin 103 is that portion of the exterior region of the DUT that is in contact with the surface of the thermally conductive mass through which heat is to be transferred to/from the DUT.

For radiant environments, the skin is that portion of the exterior region of the DUT which is exposed to the radiation source that is the source for heat transfer.

Note that while the following discussion relates to convective temperature chambers and chamber air temperatures, it will be recognized that the same principles generally apply to thermal platforms (and the platform temperature) as well as radiant heat sources, air forcing systems and similar devices. Similarly, the following discussion will describe the process of heating a DUT, but the concepts apply equally and simultaneously to cooling a DUT.

The DUT 101 is located within a thermal conditioning chamber (oven) 102 of the type well known in the testing and conditioning arts. Primary and secondary temperature probes 104, 106 are also installed within the chamber 102 to measure environmental temperature and DUT core temperature, respectively, as described further below. A temperature control system (TCS) 107 and microcomputer 500 are also operatively attached to the chamber 102 to provide control of the environment within the chamber via the chamber heating and cooling elements (not shown). Additional discussion of the microcomputer 500 and thermal conditioning system architecture are presented below with respect to FIGS. 6 and 7, respectively.

The DUT 101 illustrated in FIG. 2 is an integrated circuit, although it will be appreciated that a large variety of different types of devices may be tested and/or conditioned.

Figure 3:
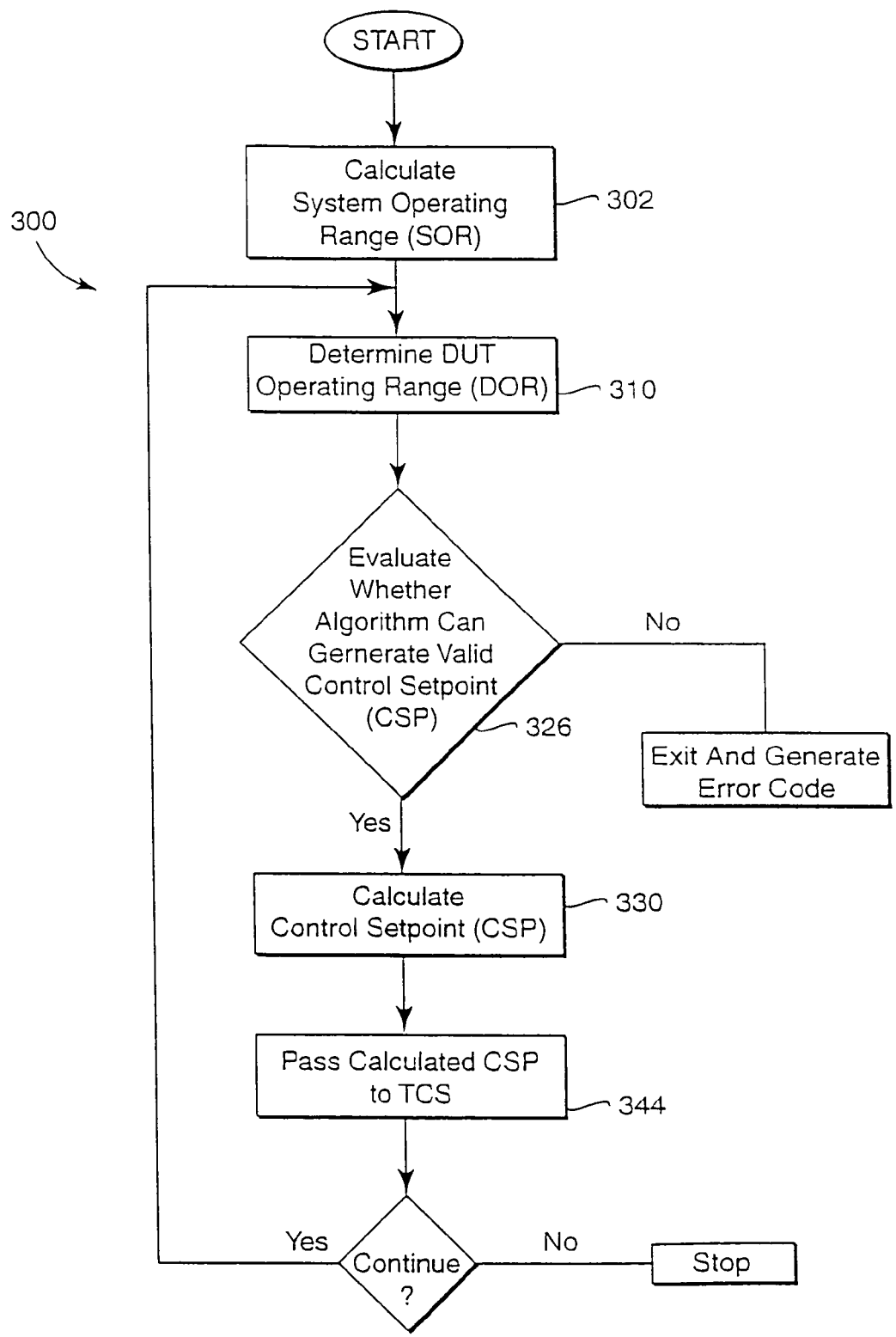
FIG. 3 is logical flow diagram illustrating the process steps associated with one exemplary embodiment of the method of the present invention.
Figure 3A:
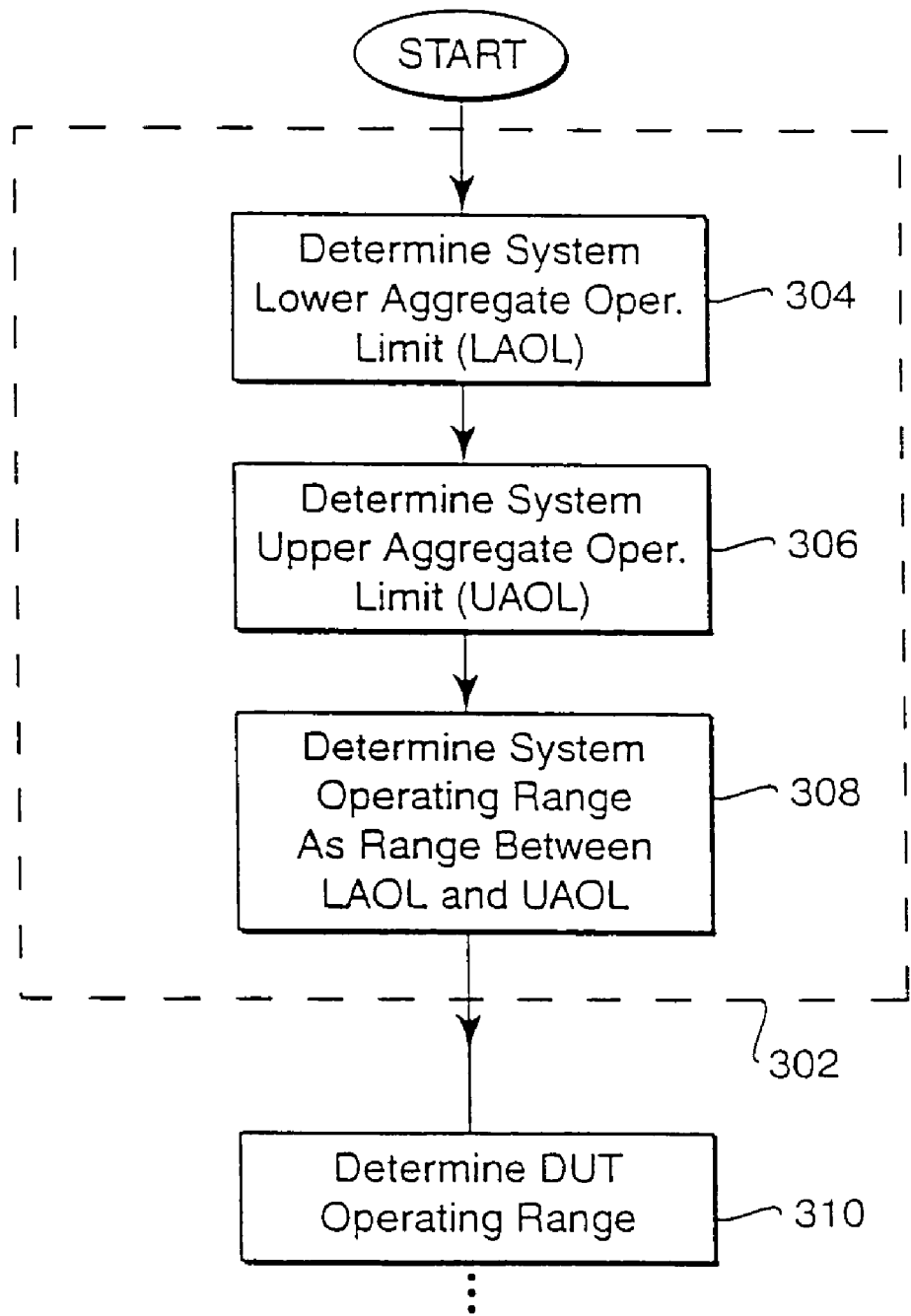
FIGS. 3a-3d are logical flow diagrams detailing the individual process steps of the method of FIG. 3.
Figure 3B:
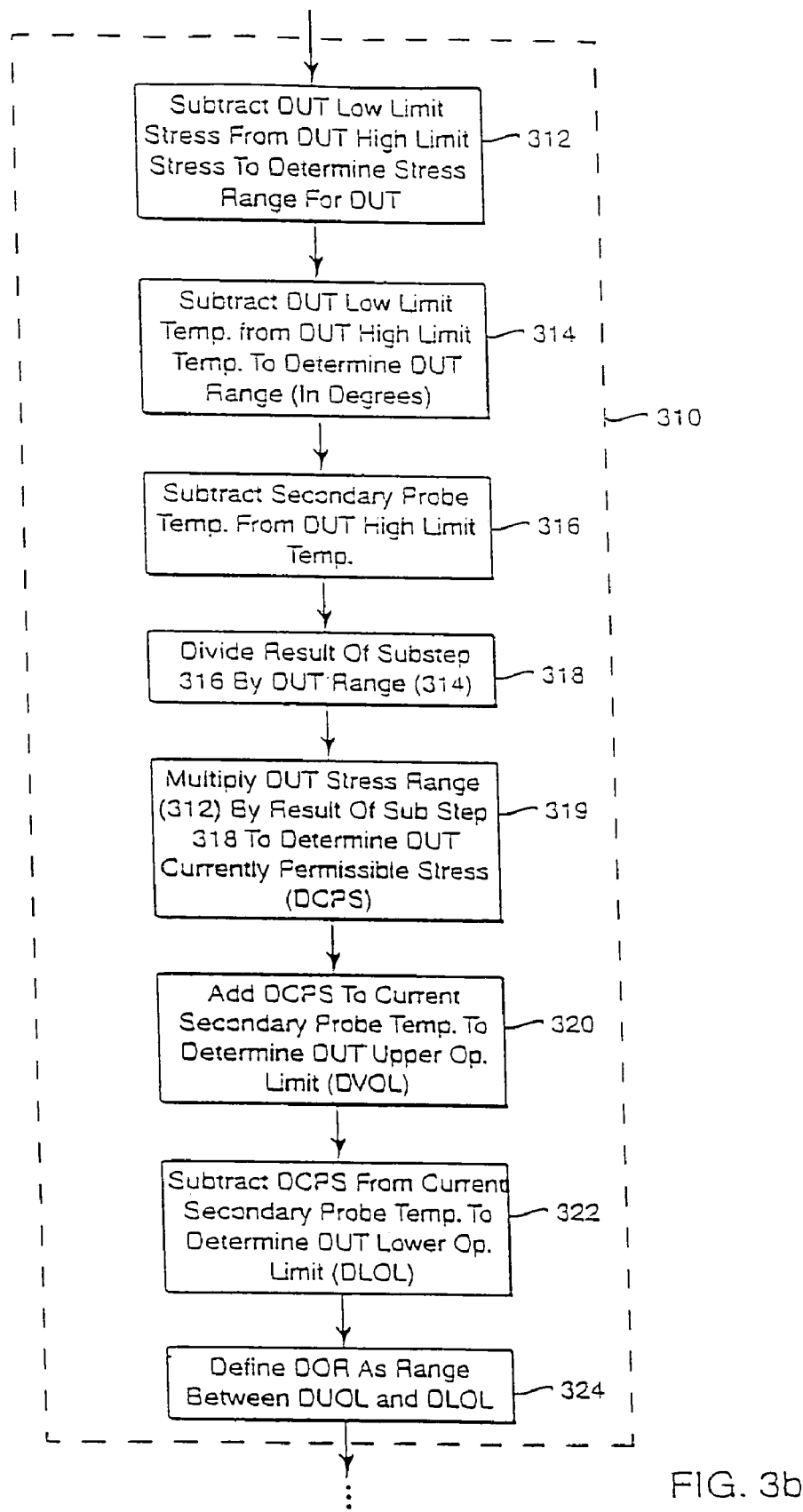

Referring now to FIG. 3, an exemplary embodiment of the method of controlling the temperature of a DUT according to the present invention is illustrated. More specifically, FIG. 3 illustrates a method for determining, in a thermal test or conditioning system, an environment temperature for a DUT such that the DUT will achieve a specified internal temperature or experience a specified internal temperature rate of change (ramp rate) as quickly as possible without violating the various temperature constraints specified by the user. It should be noted that this method is not a control system method such as those employed in prior art "PID loop" or "fuzzy logic" control systems. Such control systems and their associated algorithms are concerned primarily with the application of heating and cooling sources to an environment to best achieve a desired temperature under various conditions. Those control systems and algorithms are responsible, for example, for turning heaters on and off and for introducing cooling agents such as cryogenic coolants to the environment to achieve the desired environment temperature.

Rather, the method and algorithm of the present invention is designed to supply information to such control systems to direct the PID loop or fuzzy logic control as to what the environment temperature should be. Because heat transfer only occurs when there is a thermal differential between two bodies, or two parts of the same body, the optimum environment temperature is seldom the same as the desired DUT temperature, especially during thermal transitions of the DUT. The method and algorithm described herein defines a method for determining an effective, and often changing, environment temperature to achieve the desired thermal results in the DUT.

In the present context, the term "setpoint" is analogous to the term "environment temperature". The setpoint is that temperature which the temperature control system (PID loop, etc.) will attempt to maintain within the thermal environment. It is also assumed for the purposes of this discussion that the proper temperature control system has been selected for use with the present invention. For example, a Sigma Systems Model C4 temperature control system may be used to effectuate control of the DUT, although it will be appreciated that other types and configurations of temperature control system may be used. The construction and operation of such temperature control systems is well known in the relevant art, and accordingly will not be discussed further herein.

For simplicity of analysis, any latency associated with the chosen temperature control system in achieving the chosen setpoint is assumed to be zero (e.g., it is assumed that the setpoint, the environment temperature, and thus the DUT skin temperature, are the same). It will also be recognized, however, that the skin temperature of the DUT and the environment temperature must in actuality be different for heat transfer to take place. This difference is not something that is readily tracked or calculated. Hence, the following discussion assumes that this differential temperature does physically exist and is of sufficient magnitude to effectuate heat transfer from the environment to the skin.

As previously stated, the fundamental concept of the method of the present invention is to supply to the temperature control system a "setpoint", which may change frequently, that is likely different from the user-specified (e.g., DUT core) setpoint, and that will: 1) maximize the speed of the thermal test or conditioning routine; 2) respect the limits of the DUT with respect to both absolute skin temperature limits and thermal stress (skin/core differential); 3) respect the thermal limitations of the test or conditioning equipment being used; and 4) maximize the thermal uniformity of the DUT when the user's specified setpoint is reached in the DUT core. As used herein, the user-specified setpoint will be referred to as the Programmed Setpoint or "PSP", and the generated setpoint supplied by algorithm to the temperature control system will be referred to as the Control Setpoint or "CSP".

As described further below, the method and algorithm of the present invention will periodically determine that the CSP needs to be changed to meet the objectives of the system. In practice, the algorithm invention recalculates the CSP often and supplies the result of its calculations to the TCS as a new CSP. For a good part of the thermal test, especially during periods of thermal transition, the constantly updated CSP may be better thought of as a moving setpoint.

Two issues relating to the use of the present invention to supply a moving CSP to the TCS are considered in the design and operation of the present invention. First, virtually all temperature control systems rely on a series of feedback data from a closed loop to determine the need for heating or cooling. The systems use some type of algorithm to compare the results, over time, of the last output(s) to the feedback data, and use that information for current corrective action and to anticipate future requirements so that these requirements can be included in the current output as appropriate. The more stable the control environment, the more successful the temperature control system is likely to be. Therefore, it is desirable that an algorithm supplying a moving CSP to the TCS do so at a low and constant frequency.

Second, most temperature control systems implement some type of "proportional" or "settling band" (the "P" term of a PID system, for instance) in which the control system reduces the amount of heating or cooling in a proportional, or proportional-like, manner as the desired setpoint is approached. The proportional reduction is further modified by the system as it tries to compensate for the effects of thermal losses, thermal latency, etc. and have the controlled environment settle at the desired setpoint. These systems can become very complex in their methodology and often substantial effort is needed to create routines that will not oscillate unacceptably or show other aberrations as the setpoint is approached. It is important to recognize therefore that any system that supplies the setpoint for such a control routine must not contribute factors which can cause oscillations or other problems or which might, under some circumstances, become sympathetic to and thus amplify existing oscillations.

The present invention addresses both of these issues through (i) the proportional reduction of the CSP/PSP differential as the DUT core temperature approaches the PSP, and (ii) elimination of the movement of the CSP after the PSP is achieved.

For the purposes of this discussion, several additional assumptions are made. First, it is assumed that at least two temperature sensors (e.g., primary and secondary probes 104, 106 of FIG. 2) are available. These sensors can be of any type capable of returning temperature-related data to the controller, as discussed in additional detail with reference to FIG. 7 below. The primary probe is presumed to be within the chamber airstream, and returns a representation of the temperature of the chamber interior environment. The primary probe is the probe used by the TCS to control the temperature of the equipment providing the thermal environment for the DUT. The secondary probe can be one probe, or a series of probes averaged together, that are located inside the DUT, inside a substitute mass of similar thermal characteristics, or otherwise fed representative temperature data. A substitute mass is often used since many types of DUTs may not permit the insertion of a probe into their core region without damage to the DUT. Thus, placing the real DUT in the test or conditioning environment with a thermal "clone" containing the internal secondary probe may be the best available approximation for DUT core temperature data.

Second, it is assumed that the algorithm of the present invention receives input from the user and/or thermal conditioning system in the form of the following information:
1. DUT setpoint (e.g., core temperature desired)
2. High & low temperature limits of the system temperature controller (TCS)
3. High & low temperature limits of the temperature equipment being used (such as a chamber, platform, or other)
4. High & low temperature limits of the DUT
5. Maximum thermal differential (stress) in degrees allowable in the DUT at its low temperature limit
6. Maximum thermal differential (stress) in degrees allowable in the DUT at its high temperature limit
7. The width, in degrees, of the proportional or settling band of the temperature control system Note that all of the information listed above is either readily calculable, available from the DUT/ TCS manufacturer, or determinable from instrumentation typically associated with the thermal conditioning system. Accordingly, this information will not be discussed further herein.

Referring again to FIG. 3, the method 300 of the present invention is comprised generally of a series of process steps, several of which may be permuted in order or performed in parallel or series with other steps. Furthermore, under certain circumstances, not all steps need be performed, and alternative steps may be substituted for many of those shown. Additionally, certain mathematical operations performed as part of the method 300 may be replaced by other operations in order to achieve the same result. For example, the difference between two scalar values may be obtained by subtracting the second value from the first, or alternatively subtracting the first from the second and taking the absolute value or changing the sign of the result. The approach set forth in FIG. 3 is therefore merely illustrative of but one exemplary embodiment of the method of the present invention.

In simple terms, the method 300 of FIG. 3 moves the CSP beyond (to a higher temperature, if we are heating the DUT) the PSP by an amount equal to the difference between the PSP and the secondary probe temperature multiplied by a preselected first setup parameter (F34). The CSP is then compared to various limits and is further reduced if it exceeds those limits. Specifically, the CSP is compared to the system operating range (defined by the aggregation of the high and low temperature limits of the DUT, the TCS, and the thermal conditioning equipment). If the CSP is outside the system operating range, then the CSP is reduced sufficiently to be within these limits.

Similarly, the permissible DUT stress is determined by proportioning the high and low DUT stress limits based upon a comparison of the secondary probe temperature to the DUT range. If the CSP exceeds the combination of the secondary probe temperature plus the permissible DUT stress, then the CSP is reduced such that it is equal to the secondary probe temperature plus the permissible DUT stress at that temperature. This "final" CSP value is then passed to the temperature control system.

Detailed Description of Method and Associated Algorithm

A detailed description of the method 300 of FIG. 3 is now provided with reference to FIGS. 3a through 3d, and the definitions and assumptions provided herein. While the following discussion is cast in terms of the method employed within the Applicant's "Intelligent 2 Probe Control" (hereinafter "I2PC") computer program embodiment, it will be recognized that other algorithms, firmware, or even hardware embodiments of the disclosed method may be used with equal success. It is also noted that while the terms "determine" and "calculate" are used in describing the following method, these terms are not meant to be limited to specific processes. For example, it is contemplated that in lieu of calculating a specific value, such value may be provided by the DUT or TCS manufacturer, or otherwise obtained without the need for explicit calculation.

In the first process step 302 (FIG. 3*a*), an allowable or System Operating Range (SOR) is determined for the temperature control system. This process step 302 is comprised of several sub-steps 304, 306, 308, as follows. In sub-step 304, a system lower aggregate operating limit (LAOL) is determined as being the higher of the following: (a) the low limit of the system temperature controller; (b) the low limit of the temperature equipment; or (c) the low limit of the DUT. Similarly, in sub-step 306, a system upper aggregate operating limit (UAOL) is determined to be the lower of: (a) the high limit of the system temperature controller; (b) the high limit of the temperature equipment; or (c) the high limit of the DUT. Finally, in sub-step 308, the system operating range (SOR) is defined as the range between and including the LAOL and the UAOL determined in sub-steps 304 and 306.

Note that in the present embodiment, a valid SOR is defined as one where the LAOL is a lower temperature than the UAOL. If this condition is not met, the algorithm exits with and generates an appropriate error code.

Next, in the second process step 310 (FIG. 3*b*), the allowable or DUT operating range (DOR) is determined by calculating the DUT permissible stress at the current secondary probe temperature. In the first sub-step 312 of the second process step 310, the DUT low limit permissible stress is subtracted from the DUT high limit permissible stress to determine the DUT stress range. In sub-step 314, the DUT low limit temperature is subtracted from the DUT high limit temperature to determine the DUT range in degrees. Next, the secondary probe temperature is subtracted from the DUT high limit temperature in sub-step 316. The percentage of the DUT temperature range represented by the secondary probe temperature is then calculated in sub-step 318 by dividing the result of sub-step 316 by the result of sub-step 314. The DUT currently permissible stress (DCPS) is determined at the current secondary probe temperature (e.g., that of the DUT core) by multiplying the result of sub-step 312 by the result of sub-step 318 and subtracting this product from the high limit permissible stress for the DUT in sub-step 319.

Next, the DUT upper operating limit (DUOL) is calculated by adding the DCPS to the current secondary probe temperature (DUT core) in sub-step 320. Similarly, the DUT lower operating limit (DLOL) is determined by subtracting the DCPS from the current secondary probe temperature in sub-step 322. Finally, in sub-step 324, the DOR is defined as the temperature range between arid including the DUOL and the DLOL.

In the third process step 326 (FIG. 3*c*), the system parameters are evaluated to determine if the I2PC algorithm can operate to generate a valid CSP. It should be noted that in the present embodiment, some portion of the DOR must overlap a portion of the SOR in order for the limits of all devices to be respected. If the core temperature of the DUT plus or minus the permissible stress at that temperature defines a range (e.g., the DOR) that is outside the range that is defined by the SOR (e.g., the limits of the DUT, equipment, and temperature control system) then it will not be possible to determine a setpoint that is within both ranges and thus which respects the limits of both the DUT permissible stress and those associated with the remainder of the temperature control system.

Figure 3C:
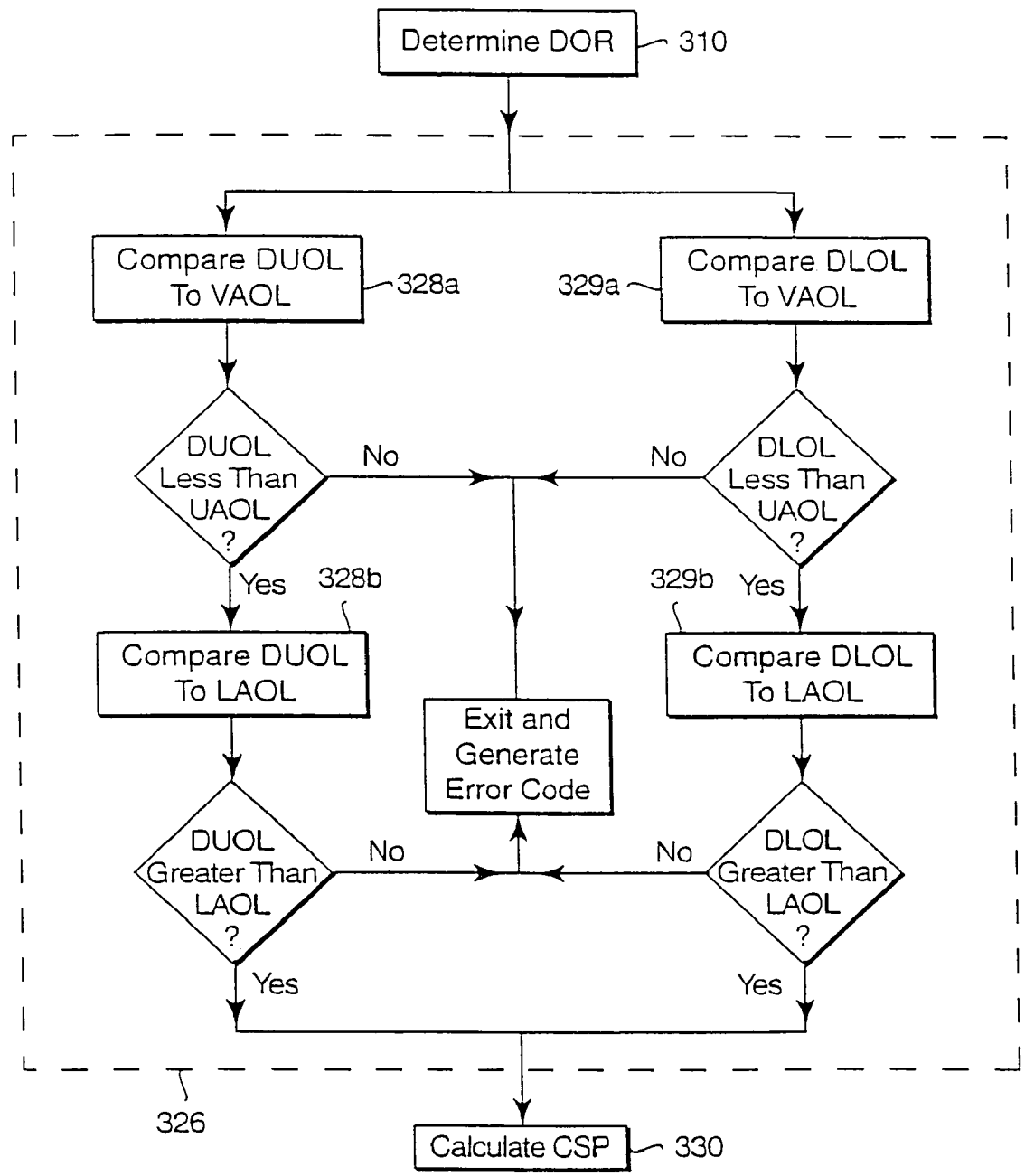
Figure 3D:
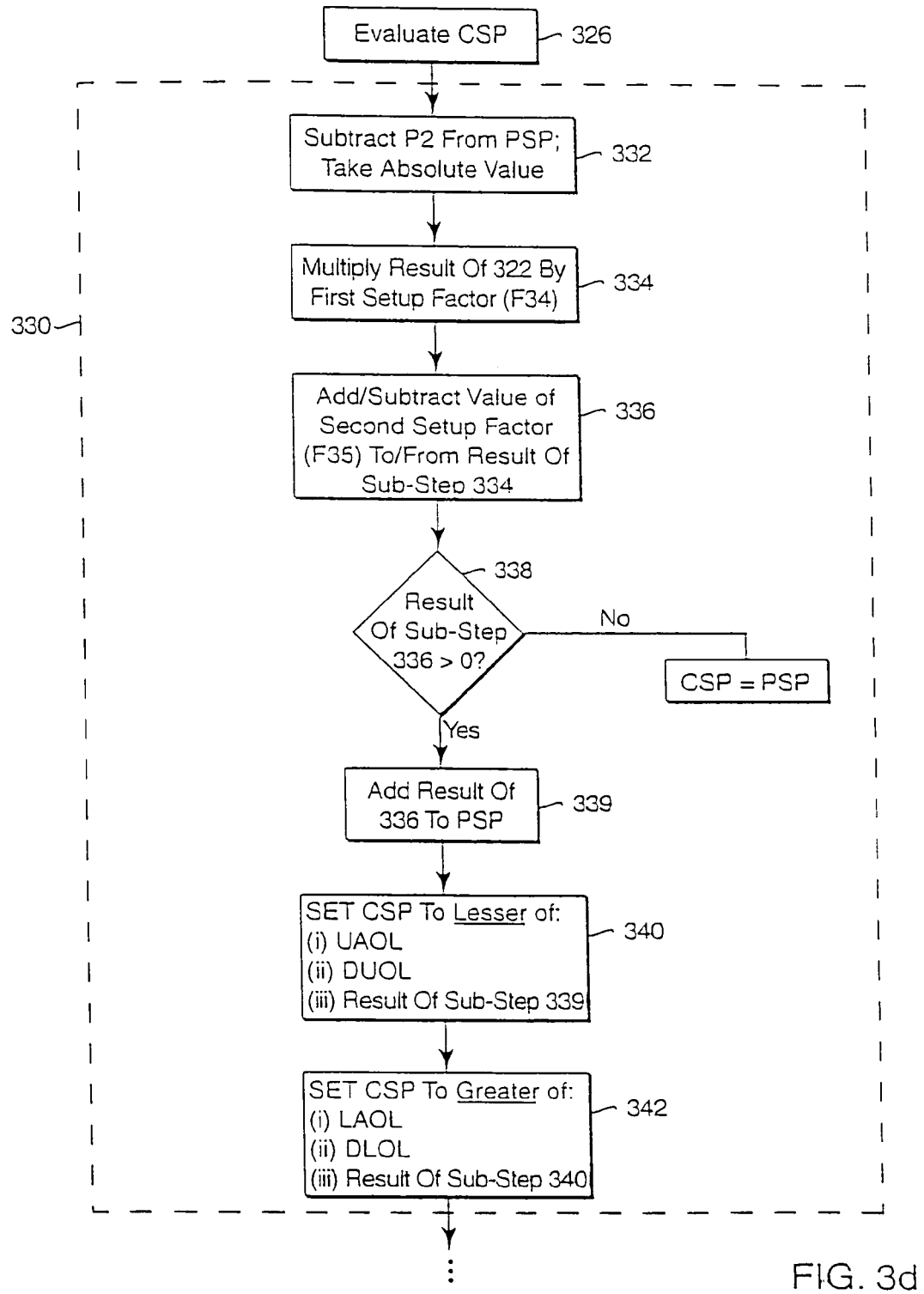

Referring again to FIG. 3*c*, the DUOL and DLOL are each compared to the UAOL and LAOL in sub-steps 328*a*, 328*b* and sub-steps 329*a*, 329*b*, respectively, of process step 326. If either: (I) the DUOL is less than the UAOL and greater than the LAOL; or (ii) the DLOL is greater than the LAOL and less than the UAOL, then a valid CSP may be calculated by the algorithm. If neither of these conditions are met, then an error code is generated by the algorithm. It will be appreciated that while a parallel approach to these comparisons is illustrated in FIG. 3*c*, other methods of comparison and logical relationships may be substituted.

In the fourth process step 330 of the method 300 (FIG. 3*d*), the Control Setpoint (CSP) is calculated. Initially, the secondary probe value is subtracted from the PSP, and the absolute value of this quantity taken in sub-step 332. In sub-step 334, the aforementioned absolute value is multiplied by a first setup factor (F34). See Appendix A. In step 336, the value of a second setup factor (F35) is added or subtracted as appropriate to the result. The first setup factor acts as a scaling factor or multiplier for the proportional term of the CSP, while the second factor represents a thermal overdrive value (in degrees). In the present embodiment, the first and second setup parameters are numerical values pre-selected or input by the operator, although it can be appreciated that these parameters can be supplied dynamically during the temperature conditioning process from another algorithm or source if desired. Typical values for the first setup factor F34 are in the range of 0.0 to 5.0 (default value=2). Typical values for the second setup factor are −20.0 to +20.0° C. (default=5.0° C.), or −36.0 to +36.0° F. (default 9° F.). The foregoing values are merely illustrative; other values may be chosen.

In sub-steps 338 and 339, the result of sub-step 336 is compared to zero and if greater than zero, is added to the PSP to determine the so-called "unlimited" CSP. Next, the result of sub-step 339 is compared to the UAOL and the DUOL in sub-step 340. The CSP is set to the lesser of these three values (e.g., unlimited CSP, UAOL, and DUOL). Lastly, the result of sub-step 340 above is compared to the LAOL and the DLOL per sub-step 342. The CSP is then set to the greater of these three values. This is the "final" CSP.

In the final process step 344 of the method 300 of FIG. 3, the "final" CSP is passed to the temperature control system for use thereby.

It will further be recognized that the method 300 (and associated algorithm) disclosed herein has several operational attributes which provide advantages over prior art systems and methods. Specifically, the algorithm of the present invention (i) automatically reduces the excess heating/cooling as the DUT core approaches the PSP; and (ii) automatically stops moving the setpoint and enters into normal PID control when either the PSP is reached (within the tolerance of the settling band temperature tolerance parameter F31, described below), or when a predetermined period of time without significant change in the DUT core temperature expires. These attributes are discussed in additional detail below.

Automatic Reduction of Excess Heating/Cooling—Because the CSP exceeds the PSP by an amount related to the difference between the secondary probe and the PSP, the amount the CSP leads the PSP is automatically reduced as the DUT core temperature approaches the PSP. Using the CSP to cause the thermal environment to exceed the PSP results in faster thermal transfer to/from the DUT to the increased differential. Assuming that the DUT skin temperature approaches the environment temperature, the DUT core is the primary beneficiary of the increased heat transfer.

As the DUT core continues to increase in temperature due to this increased differential, the secondary probe temperature (DUT core) begins to approach the PSP. As this occurs, the difference between the PSP and the secondary probe temperature becomes smaller and the CSP is accordingly reduced. All of this will occur with a continuous reduction in the CSP lead of the PSP and thus the environment temperature such that the DUT skin temperature will be reduced as the core temperature is rising. The result is that the skin and core temperatures nearly coincide as the setpoint is reached. The setup parameter F35 allows the operator to account for thermal latency inherent in the DUT, which is related to the heat capacity of the DUT material(s) as well as the thermal conductivity of the material between the DUT skin and core region.

Automatic Termination of Setpoint Movement—Substeps 336 and 338 described above reduce or enlarge the amount of lead of the CSP over the PSP by the amount of the second setup parameter F35 so that when the CSP/PSP difference equals or is less than the magnitude of the setup parameter, the PSP and the CSP are the same value. From this point on in the temperature transition, the system will behave as a one probe system relying on the primary probe in the airstream of the exemplary chamber described herein. When the PSP is reached by the secondary probe, plus or minus the value of the settling band parameter F31, the I2PC algorithm is exited in favor of normal PID control. Thus, when used in conjunction with the present invention, the temperature control system does not have to arbitrate or compensate for a moving setpoint while trying to settle on the user's defined setpoint while inside the settling band.

Additionally, the I2PC algorithm is exited in event that the PSP (+/−F31) is not reached by the secondary probe within a predetermined period of time (i.e., "times out"). This condition is utilized to preclude the algorithm from operating indefinitely in the case where the PSP can not practically be achieved, such as where the maximum rate of heat generation within a test platform is not sufficiently high to offset radiated heat or other losses from the DUT, or where calibration errors within the temperature probes or other equipment exist. In one embodiment, the I2PC algorithm calculates the change in secondary probe temperature over time; if secondary probe temperature does not vary by a predetermined amount within a given period of time, I2PC will be exited. It will be recognized that other "time out" schemes may be used, such as measuring the time from entry of the last user-specified setpoint, or time from achieving a certain percentage of the desired setpoint temperature. Furthermore, while the aforementioned time out function is hard coded into the firmware of the apparatus of the present invention, it will be appreciated that other methods may be used, such as by time out parameters input by the user via software.

The foregoing approach allows a very aggressive thermal overdriving of the system (e.g., environment temperature greater than the DUT core temperature and the PSP) to achieve a desired temperature within a high latency DUT. However, to allow stable PID control, once the DUT has reached or passed through the PSP+/−F31, discontinuing I2PC adjustments allows normal PID control to continue without the risk of interference by the I2PC algorithm. Note that the I2PC algorithm is reinstated with each new setpoint specified by the user. When a new setpoint is specified, the algorithm of the present invention recognizes (1) that a new setpoint has been entered, and (2) the ramp required (i.e., whether the ramp is UP or DOWN), so it knows which way to adjust the CSP.

It should also be noted that the approach of the present invention allows stable and predictable operation of the temperature control system as a whole. Specifically, since the CSP is calculated by the I2PC algorithm on each "loop" of the feedback processing within the TCS (or at another regular interval specified by the operator), a regular variation of CSP results. As previously discussed, the operation of the TCS (and any associated PID or fuzzy logic device) is generally enhanced when corrections are applied in such a periodic fashion.

Figure 1:
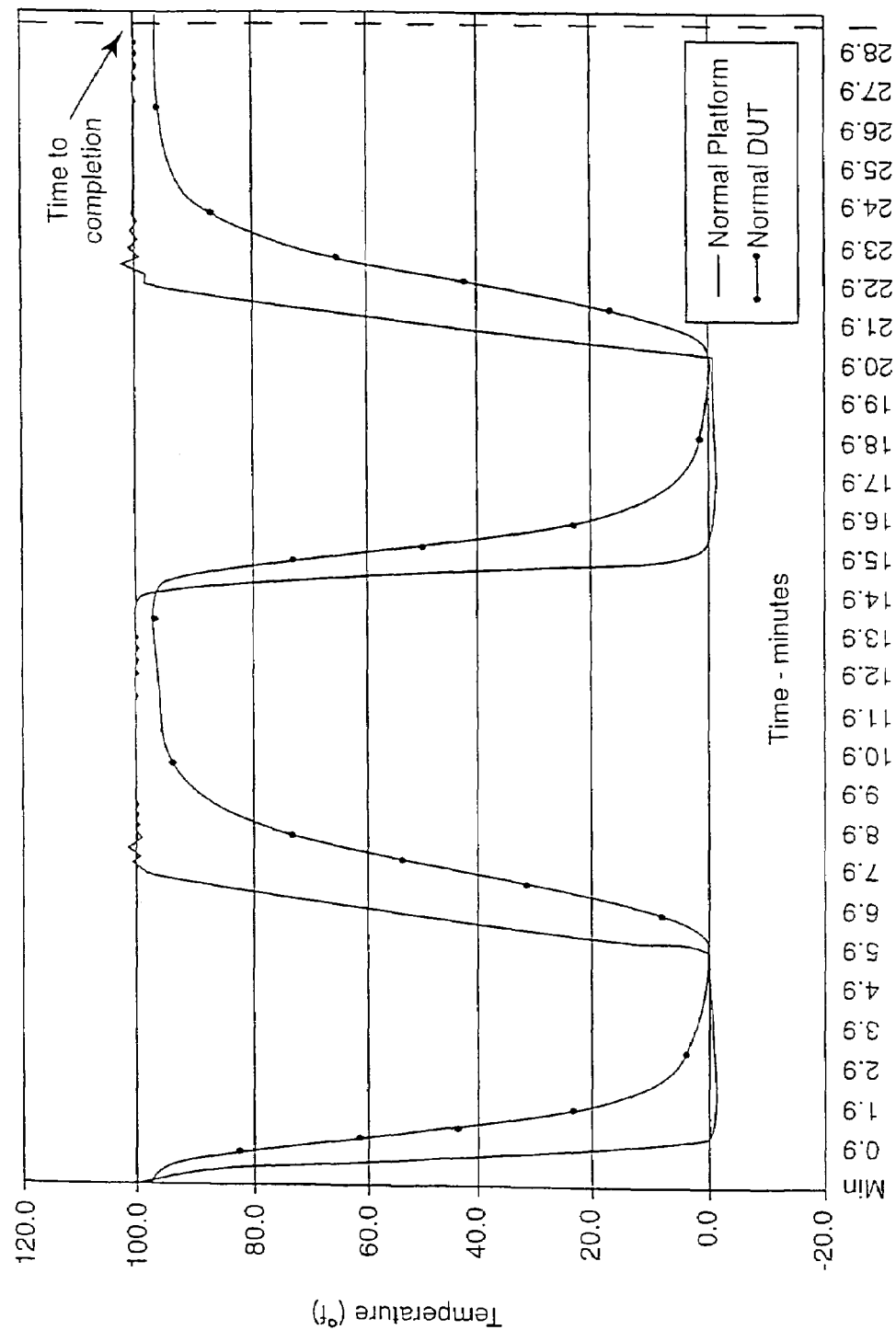
FIG. 1 is a graph illustrating the cyclic temperature response of a typical prior art thermal conditioning system (and DUT being conditioned) as a function of time.
Figure 4:
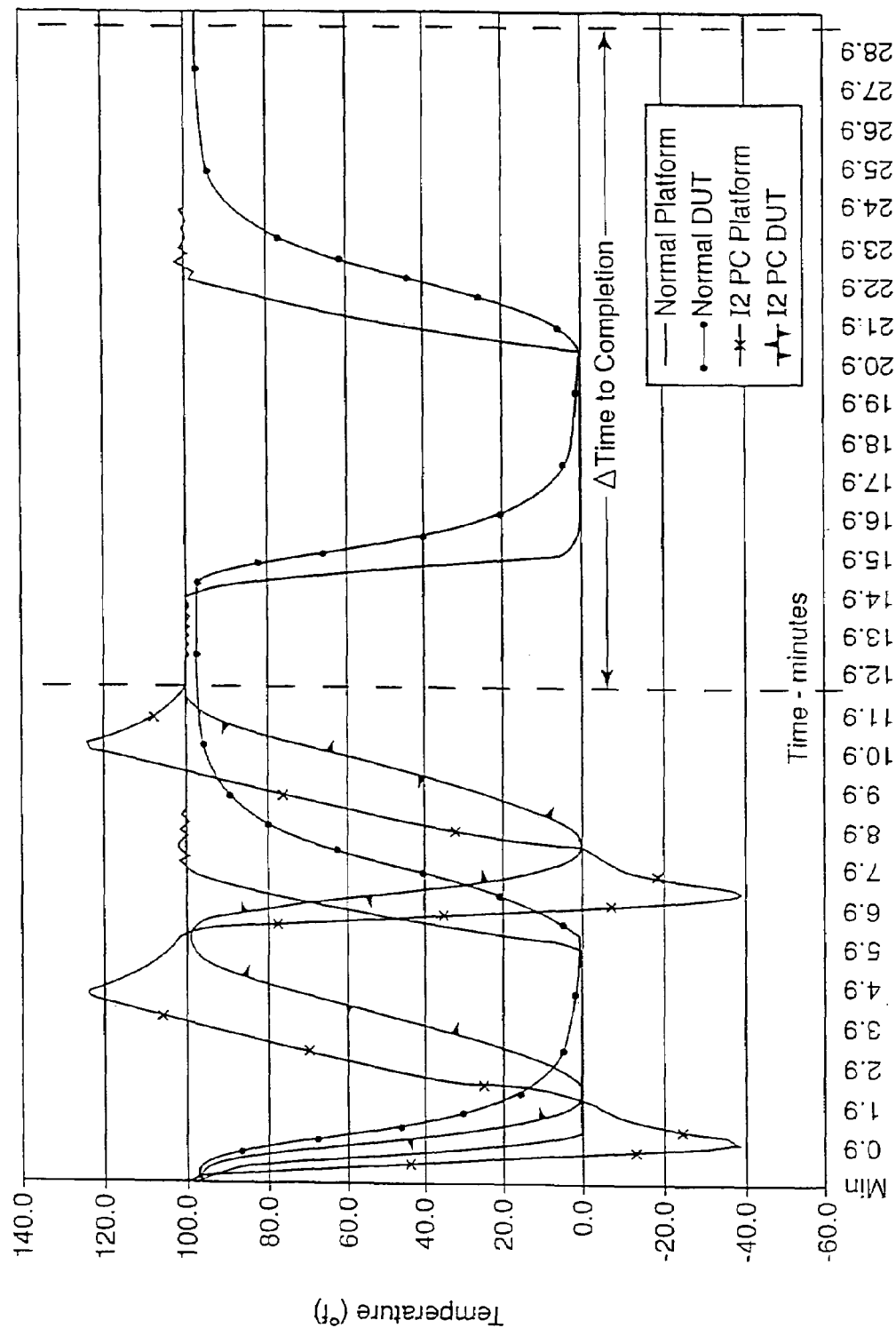
FIG. 4 is a graph illustrating the cyclic temperature response of a temperature control system employing the method of the present invention as compared to that of the prior art system illustrated in FIG. 1b.

FIG. 4 illustrates the cyclic temperature response of an exemplary temperature control system employing the method of the present invention, as compared to that of the prior art system illustrated in FIG. 1a. As illustrated in FIG. 4, the I2PC algorithm of the present invention achieves a much more rapid change in DUT core temperature than the prior art system, due primarily to the use of thermal overdrive in the present invention. Note that the prior art system does not use thermal overdrive, but rather ramps the environmental (e.g., chamber or platform) temperature up or down to the PSP, which results in a much lower temperature differential between the environment and the DUT core, and thereby slows the response time of the system. In a cyclic testing scenario where one or more DUTs must be tested or conditioned over many thermal cycles, the time savings and economies afforded by the present invention are substantial. Additionally, as previously noted, the algorithm of the present invention respects the critical thermal differential limits associated with the thermal conditioning system, its controller, and the DUT itself while accomplishing this result.

Appendix A illustrates one embodiment of the aforementioned algorithm according to the present invention.

Description of Variable Differential Limits

Figure 5A:
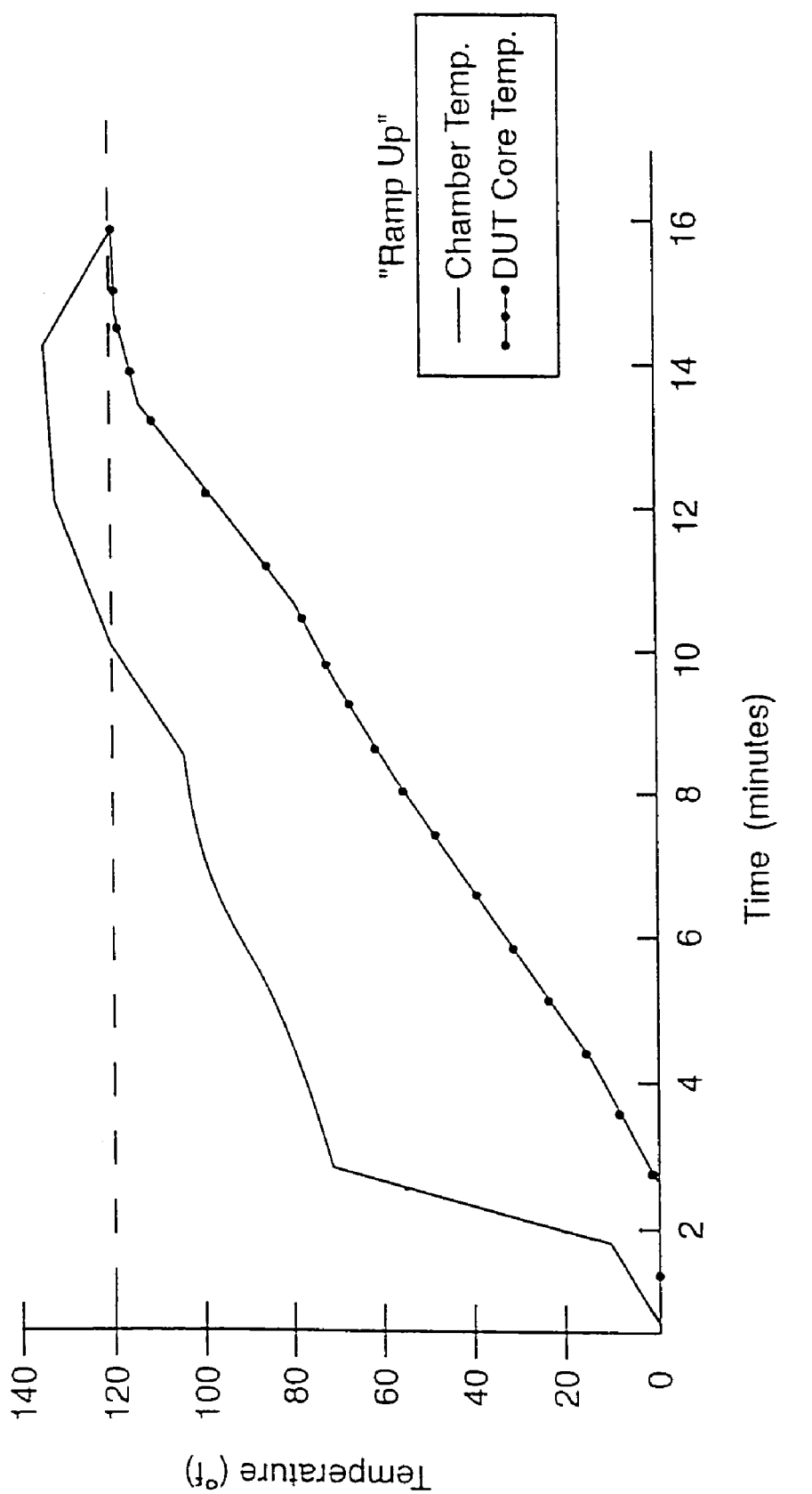
FIGS. 5a and 5b are graphs of the temperature of a thermal platform and the corresponding response of an exemplary DUT when conditioned using variable temperature differential limits during ramp up and ramp down, respectively.
Figure 5B:
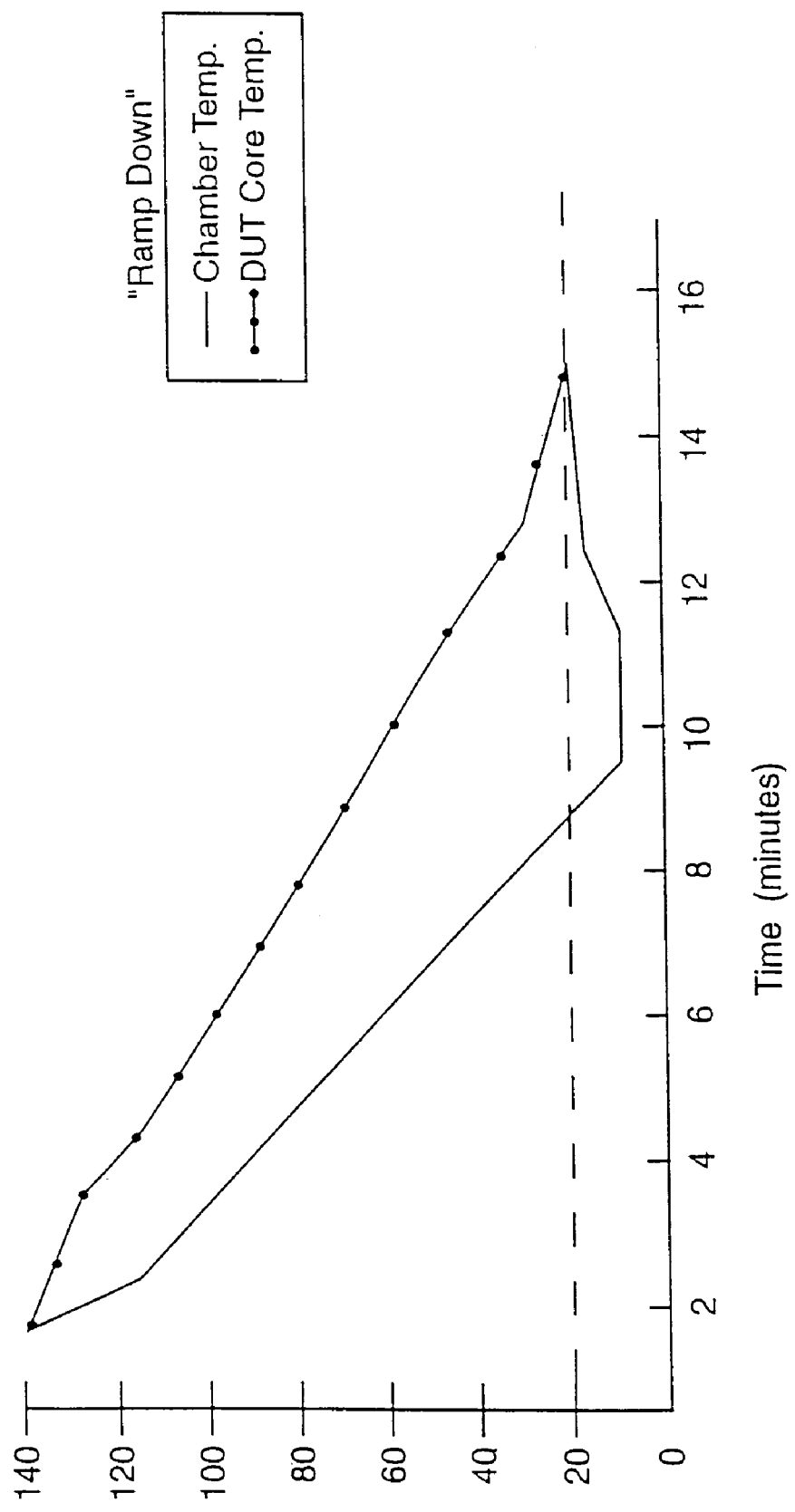

Referring now to FIGS. 5a and 5b, an improved method and algorithm for controlling the temperature differential limits of a device under test (DUT) is described. As shown in FIGS. 5a and 5b, the differential temperature existing between the thermal environment (in the present example, a thermal chamber) and the DUT core temperature varies as a function of the DUT core temperature. This approach is utilized based on the physical property of many DUTs that the maximum allowable differential temperature within the DUT varies as a function of the temperature of the DUT. This property results largely from thermally induced stresses occurring within the materials of the DUT which may damage or impair the DUT if the aforementioned differential temperature limitations are exceeded (i.e., thermal "shock"). For example, at 0° F., a given DUT may be able to sustain a differential temperature of $\Delta T_l$° F. without excessive thermal stress, whereas at 100° F., the maximum allowable differential is $\Delta T_u$° F. In the exemplary ramp-up of FIG. 5a, the allowable temperature differential at low temperature is significantly larger than that at high temperature, thereby indicating that the DUT under test is more restricted in heatup/cooldown rate at higher temperatures. In the present embodiment, the allowable lower and upper temperature differentials are calculated based on the absolute lower and upper temperature limits of the DUT; that is, the allowable temperature differentials $\Delta T_l$ and $\Delta T_u$ at the absolute lower and upper temperature limits for the DUT (DOR from step 310 above) are used as endpoints to "envelope" the entire temperature range. This approach is considered conservative with respect to all allowable temperature differentials between the upper and lower absolute temperature limits.

While linear extrapolation between these endpoints is used in the present embodiment, it will be appreciated that other functional relationships (f(T) in Eqn. 1 above) may be used as well. Note that in contrast to step 310 of the previously described method, in which the absolute temperature limits of the DUT (and thus the DOR) are determined, the specification of variable differential temperature limits seeks to restrain or control the difference between the DUT core and the conditioning environment temperature (e.g., air temperature in the conditioning chamber). The aforementioned variation in allowable temperature differential is preferably accomplished using an algorithm which periodically samples the DUT core temperature (per input received from the secondary probe) and calculates the allowable differential for that temperature based on the user's initial input of (i) lower and upper allowable differential temperatures $\Delta T_l$ and $\Delta T_u$ and (ii) the function f(T). This calculated limit is then imposed upon the system via the CSP, which is adjusted so as to maintain the differential within the prescribed limit.

Description of Computer System and Thermal Conditioning System

Figure 6:
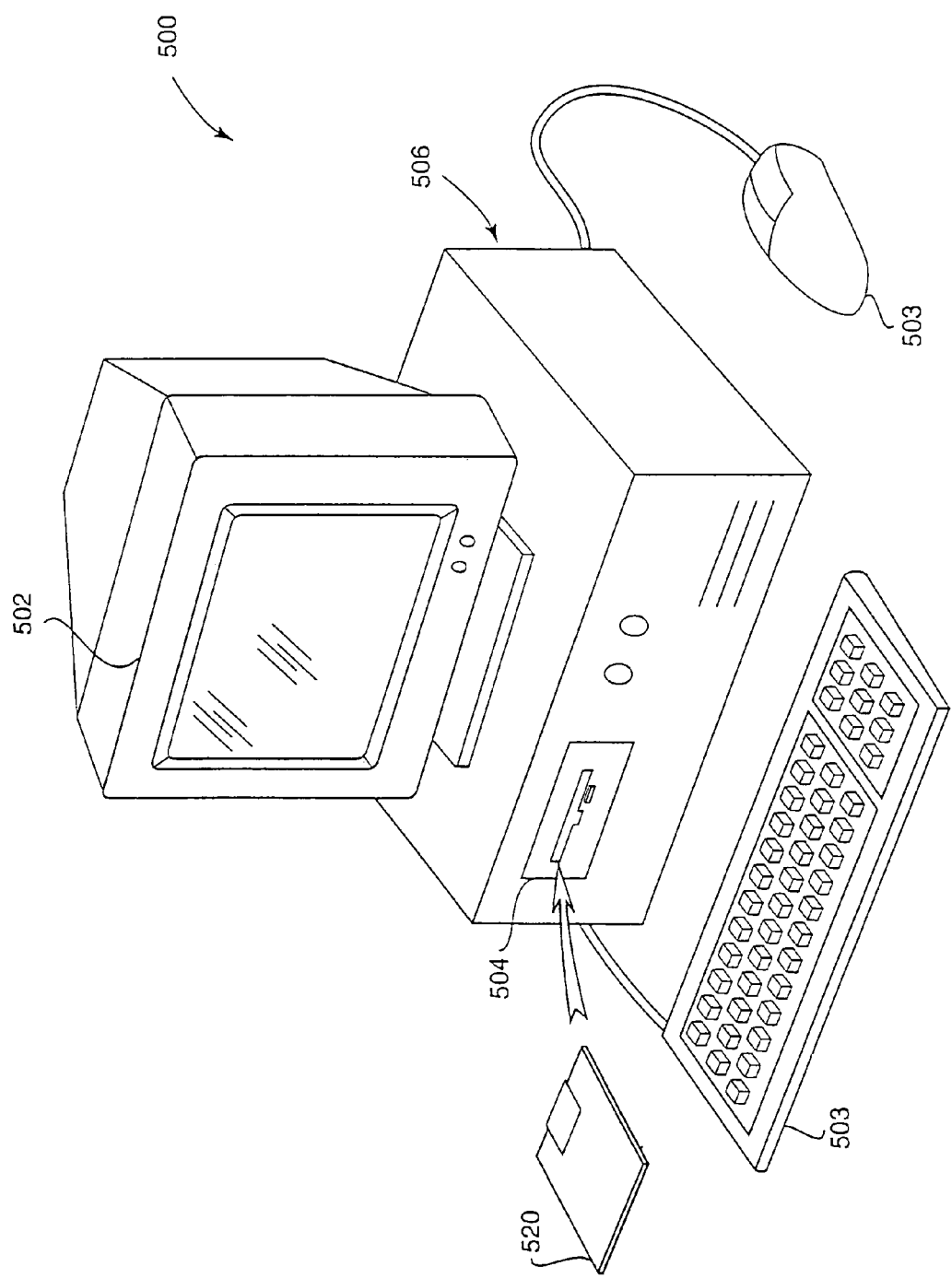
FIG. 6 is a perspective view of a microcomputer system having a computer algorithm incorporating the method of FIG. 3.

FIG. 6 illustrates one exemplary embodiment of the algorithm of the present invention as installed on a microcomputer system 500. As shown in FIG. 6, the microcomputer system 500 comprises a display 502, input device 503, non-volatile storage device (e.g., magnetic disk drive) 504, and output port 506. Additionally, the system includes a central processor 509 and internal memory 510 (see FIG. 7). The aforementioned temperature control algorithm in the form of a computer program (I2PC) rendered in object code is stored ideally on the disk drive 504 (or a discrete storage medium such as a floppy disk 520 associated therewith), or loaded into the internal memory of the computer system 500, where it may be recalled by the processor and associated peripherals such as a DMA module for execution. The output port 506 is coupled to the temperature control system 107 of FIG. 2, the latter receiving the CSP from the algorithm/processor in the form of data transmitted via the output port 506 and associated data connection, such as a serial port, IEEE-488 (General Purpose Instrument Bus), or Ethernet connection. While the temperature control algorithm in the present embodiment resides within the storage devices of the microcomputer system 500, all or part of the algorithm may also reside within temperature controller of the associated thermal conditioning device (e.g., temperature chamber, thermal platform, thermal chuck, or thermal airstream), or other non-volatile programmable storage device such as an EEPROM which is associated with the temperature control system.

Figure 7:
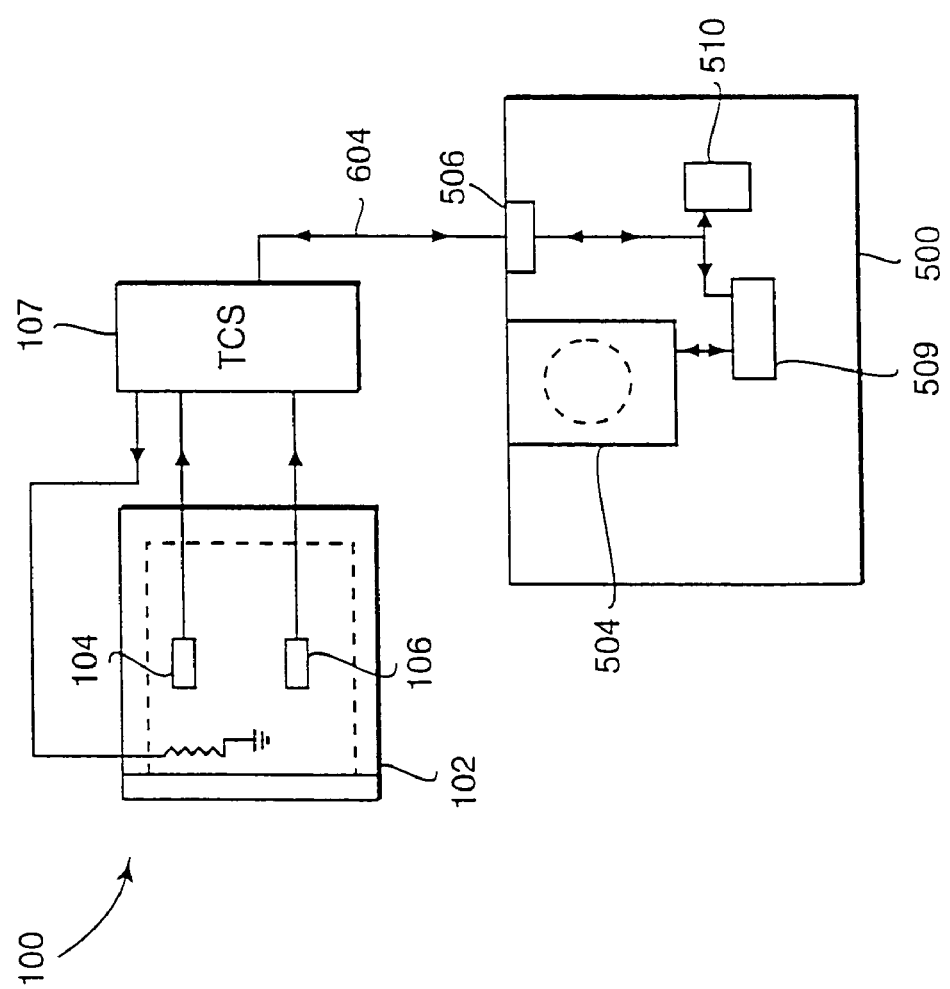
FIG. 7 is a functional block diagram of an exemplary thermal conditioning system incorporating the microcomputer and algorithm of FIG. 6.

Referring now to FIG. 7, an exemplary thermal conditioning system architecture utilizing the microcomputer system of FIG. 6 is described. As illustrated in FIG. 7, the conditioning system 100 comprises the microcomputer system 500 with algorithm (not shown), a temperature control system 107, a thermal conditioning chamber 102, primary and secondary temperature probes 104, 106, and data interface 604. As previously noted, the temperature sensors 104, 106 may be of any type of temperature sensor which generate data related to the temperature of the environment or component being measured, such as a resistance temperature detector (RTD) or thermocouple. The thermal conditioning system 100 of the present invention utilizes two 500 ohm platinum RTD probes, although others may be used as well.

During operation, temperature data obtained from the probes 104, 106 as well as that generated by the TCS 107 is passed to the microcomputer 500 and algorithm wherein the CSP is periodically calculated by the algorithm and passed via the data interface 604 back to the TCS. It will be appreciated by one of ordinary skill in the relevant arts that numerous alternate configurations incorporating hardware, software, and/or firmware may be may be employed in practicing the invention disclosed herein. For example, a thermal platform could be substituted for the conditioning chamber 102 of FIG. 7. Similarly, an algorithm incorporating the method of the present invention could be stored within the internal memory of a digital signal processor located within the TCS 107, or within a remote networked computer, as opposed to using the microcomputer system 500 of FIG. 7.

Latent Temperature Control Methodology and Apparatus

In another aspect of the invention, an improved apparatus and method for latent temperature control is now described in detail. It will be recognized that while the invention is described in terms of an exemplary algorithm or computer program adapted to run on an embedded digital processor, the methodologies described herein may be readily adapted to other hardware and software environments by those of ordinary skill.

In its simplest form, the algorithm of the present invention controls the temperature of the underlying device, such as a thermal platform, or fluid conditioning system, to affect the temperature of a DUT so as to achieve a temperature specified as the DUT setpoint. Notably, the present invention is advantageously made "event triggered"; i.e., it adjusts the output of the controller based on the occurrence of events (e.g., stabilization of DUT temperature or some other observable or group of observables) rather than solely relying on a constantly changing error or differential signal. This is particularly advantageous in applications where there is a high degree of latency due to, for example, the DUT thermal characteristics, or the physical configuration of the conditioning apparatus (e.g., a significant run of piping between the thermal controller and the conditioning chamber or platform).

It will also be appreciated, however, that the use of the latent control methodology of present invention is not restricted to homogeneous applications, but rather may be used alone or in a heterogenous control system (i.e., one with both latent control and prior art PID or feedback loop features). For example, outputs from a conventional PID/feedback controller and the latent controller of the present invention may be used as inputs to control logic or algorithms which determine the appropriate control signal(s) based on the multiple inputs, or alternatively which use one signal as a gating or enabling/disabling signal. Similarly, the temperature control methodologies previously described herein with respect to FIGS. 1-7 may be used in conjunction with the latent control techniques of the present invention. Myriad combinations employing the latent approach may be fashioned by one of ordinary skill given the disclosure provided herein.

Figure 8:
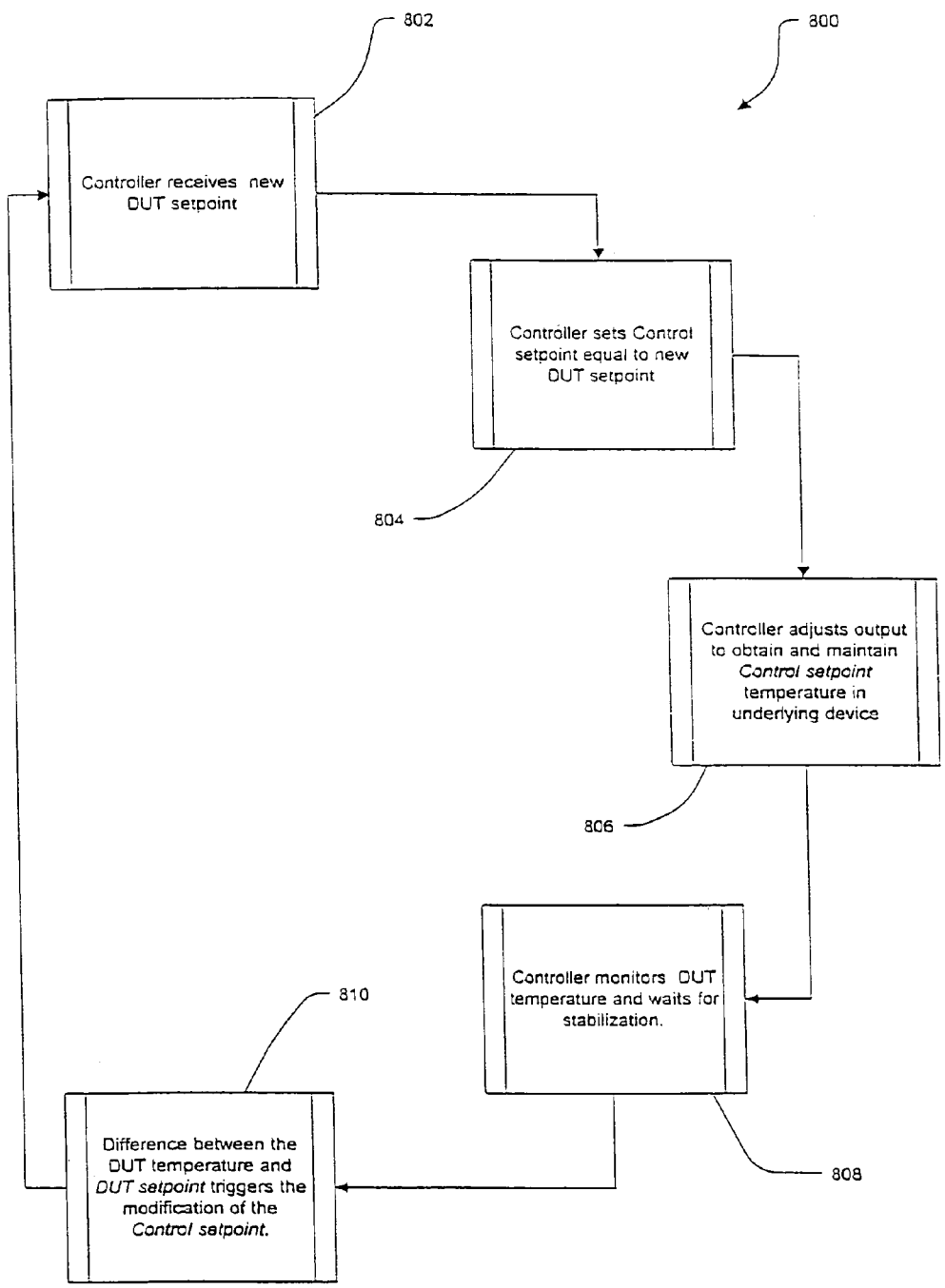
FIG. 8 is a logical flow chart illustrating an exemplary embodiment of the generalized latent temperature control methodology of the present invention.

FIGS. 8 and 8a illustrates one exemplary embodiment of the latent temperature control methodology according to the invention. In this embodiment, the temperature controller (see FIGS. 9 and 10 below) directly controls the temperature of the underlying conditioning device using feedback from a first temperature sensor (i.e. Probe 1, or P1) located in, or on, such device. The controller uses a second temperature sensor (i.e. Probe 2, or P2) to measure the temperature of the DUT. The controller's outputs affect directly only the temperature of the underlying conditioning device, while indirectly affecting the temperature of the DUT according to latency present between the conditioning device and DUT.

When the controller receives a new DUT setpoint value (step 802), a control setpoint value (control_setpoint) is set equal to this new DUT_setpoint per step 804. The controller adjusts its output, based upon data from P1, to obtain and then maintain the control setpoint temperature in the underlying conditioning device (step 806). When the underlying device is thermally stable, the controller continues to control it at the control setpoint temperature while monitoring the temperature of the DUT as reported by inputs from P2 (step 820 of FIG. 8a). When the temperature of P2 has changed (step 822), as measured by either (i) expiration of a predetermined interval (F46) by the DUT_change_timer (which was started upon the conditioning device temperature achieving the control setpoint) (step 824a); or (ii) the DUT temperature as measured by P2 has changed by a predetermined amount (e.g., F45) (step 824b), the stability of the DUT temperature is then evaluated over subsequent periods (step 826). The foregoing "change" criterion is used to affirm that the DUT has in fact responded to the initial temperature stimulus before stabilization (i.e., mitigates the possibility that the controller will identify pre-stimulus stability as post-stimulus stability). DUT thermal stability is determined according to a predetermined stabilization criterion (i.e., the "event" of the present embodiment) per step 808. Specifically, in the present embodiment, either (i) the DUT temperature band and time at temperature parameters (F40, F41) are used; i.e., if P2 maintains within the band for a predetermined time, then stability is achieved (step 828a); or (ii) the DUT_stability_timer has reached a prescribed timeout value (F43) (step 828b). Once stability is achieved (step 830), the difference between the DUT temperature (as reported by P2) and DUT_setpoint triggers the subsequent modification of the control setpoint per step 810. In the illustrated embodiment, the temperature band stabilization of step 808 is accomplished by differencing of two or more temperature measurements of the DUT over a finite period of time (F41), and the comparison of the absolute value of this difference to a predetermined threshold band parameter (F40).

Alternatively, however, other stabilization criterion may be used alone or in conjunction with the foregoing. For example, a rate criterion may be generated, such as in the case where a change in DUT temperature (positive or negative) of 1 degree F. occurs over a period of $\tau=10$ seconds, with the resulting rate of change ($\frac{1}{10}=0.1°$ F./sec) being then compared to a predetermined rate criterion (say, for example, 0.2° F./sec) to determine if stabilization has occurred. It will be recognized that literally any manner or form of stabilization method and/or criterion may be used consistent with the invention, whether based on P2 temperature or some other indicia.

In terms of the subsequent modification of the control setpoint per step 810, this is accomplished in the illustrated embodiment by first determining an average temperature parameter (e.g., P2_average_temp) during a given averaging interval (F42). Next, the temperature conditioning device setpoint is adjusted by an amount related to the difference between the current control setpoint and P2_average_temp. The underlying device is then brought to the new control setpoint temperature (step 806), and the process 800 is repeated If the P2 temperature remains stable at the DUT setpoint, the process 800 is finished except to maintain the status quo. However, the controller constantly monitors the DUT temperature at P2 so that if a previously stable DUT changes temperature, the adjustment can be made for these changing conditions in the same manner as prior adjustments.

Appendix B hereto provides an algorithmic illustration of the foregoing exemplary embodiment of the latent control process of the invention.

In another embodiment of the method 800, the initial control setpoint is made to vary from the DUT_setpoint by either a fixed amount ("offset"), or by an amount determined by a relationship (deterministic or otherwise) based upon for example experiential/historical data or user-specified data. Likewise, subsequent adjustments to the control setpoint may be modified by similar data.

It is further noted that the exemplary embodiment of the process 800 (and apparatus of FIGS. 9 and 10 below) includes timer functions in all processes that can halt the main control process 800 if certain conditions are not met, so that the algorithm will not "hang" 800 for extended periods in the event that decision data are unavailable or insufficient to satisfy the decision criteria. However, it will be appreciated that the invention may be practiced without such timer functions if desired.

If the DUT is known to have or requires room for thermal oscillation or change, then either a tolerance for these excursions, or a system such as windowed averaging of P2 over time, may be included to allow the control system to differentiate between such excursions and unwanted, or unexpected, thermal changes.

Additionally, it will be recognized that other types of "events" (i.e., other than those previously described, and/or other than those based on thermal stabilization) may also be used alone or in conjunction with the aforementioned approach. For example, the occurrence of a particular artifact in the DUT or underlying device thermal profile (such as a flat spot or cusp, or minima/maxima in first or second derivative curves) may indicate the need for alteration of the control setting. Alternatively, the occurrence of a non-thermal event (e.g., a change in electrical conductivity, capacitance, mechanical property such as stress or strain, etc.) in the DUT may be used as the basis for latent control according to the invention.

In yet another embodiment, the system controller is programmed with algorithms for adjusting the temperature of the underlying conditioning device based on the properties (e.g., non-linearities) of specific materials. For example, if it is known that within a certain temperature range, greater or smaller increments of temperature changes in the underlying device causes greater or smaller changes in the DUTs stable temperature respectively, then such information can be stored in the controller (such as in a look-up table or other profile) and accessed to permit on-the-fly adjustment of the algorithm 800 under such conditions. This approach advantageously allows the controller to bring the DUT to the desired temperature more quickly than use of non-material specific profiles.

In yet another embodiment, the controller is adapted to receive data regarding the DUT's initial temperature before setting the initial control_setpoint parameter. Thus, if the DUT's initial temperature significantly differs from the DUT_ setpoint, the initial Controller setpoint may be set at a value that will converge the DUT setpoint and DUT temperature (P2) more quickly. For example, selective and controlled use of temperature overshoot (i.e., setting the platform or other conditioning device setpoint temperature higher than the DUT_setpoint value for a period of time) may be employed.

In yet another embodiment, the controller is programmed to bring the DUT to a series of DUT_setpoint values over time. For example, after bringing the DUT to a first setpoint, and then maintaining it at the setpoint for a given period of time, the controller then brings the DUT to a second setpoint which may be higher or lower than (or bear some deterministic relationship to) the first setpoint. This process continues until all the programmed or deterministic setpoints are met.

Figure 9:
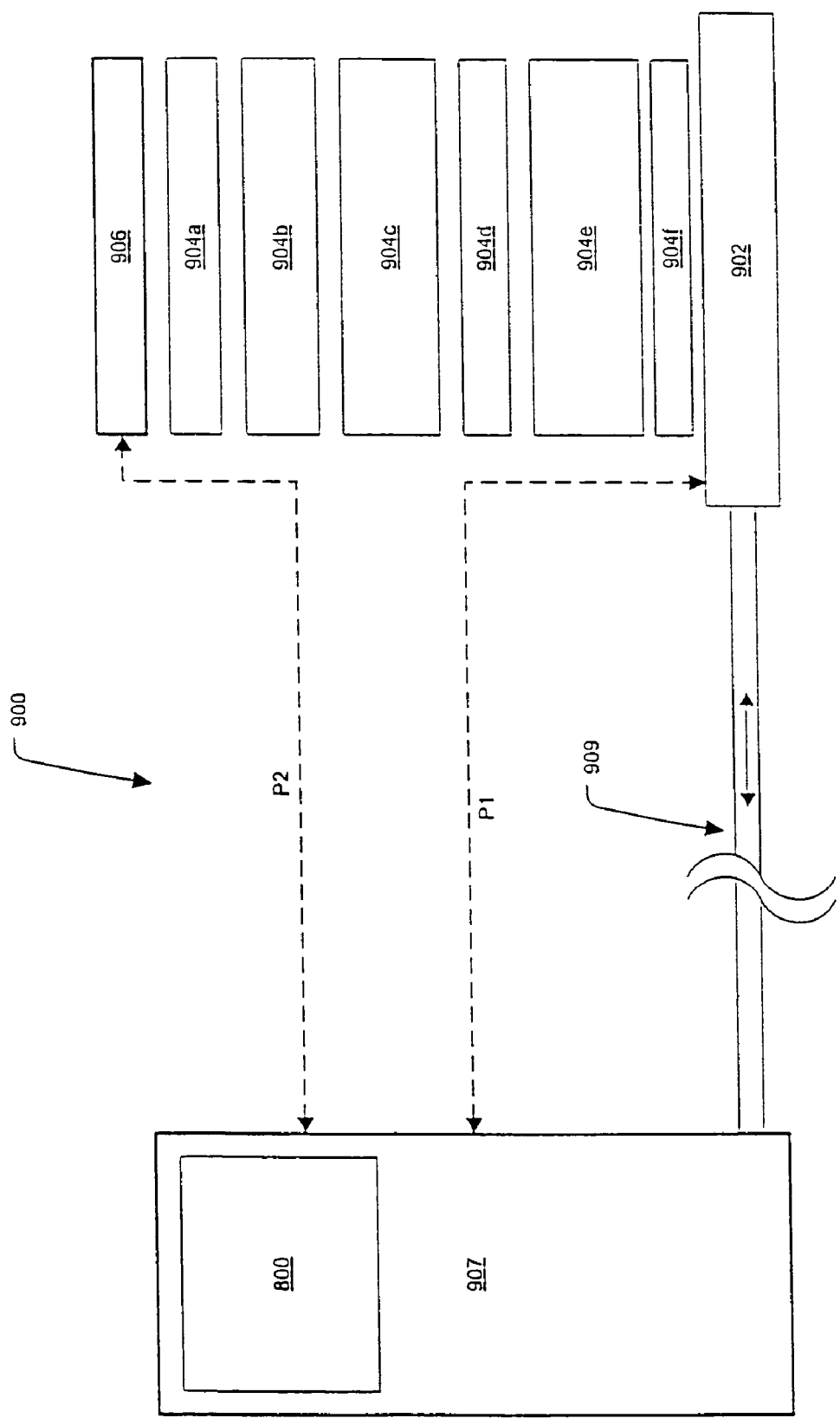
FIG. 9 is a functional block diagram of a first embodiment of a latent thermal conditioning system according to the invention.
Figure 10:
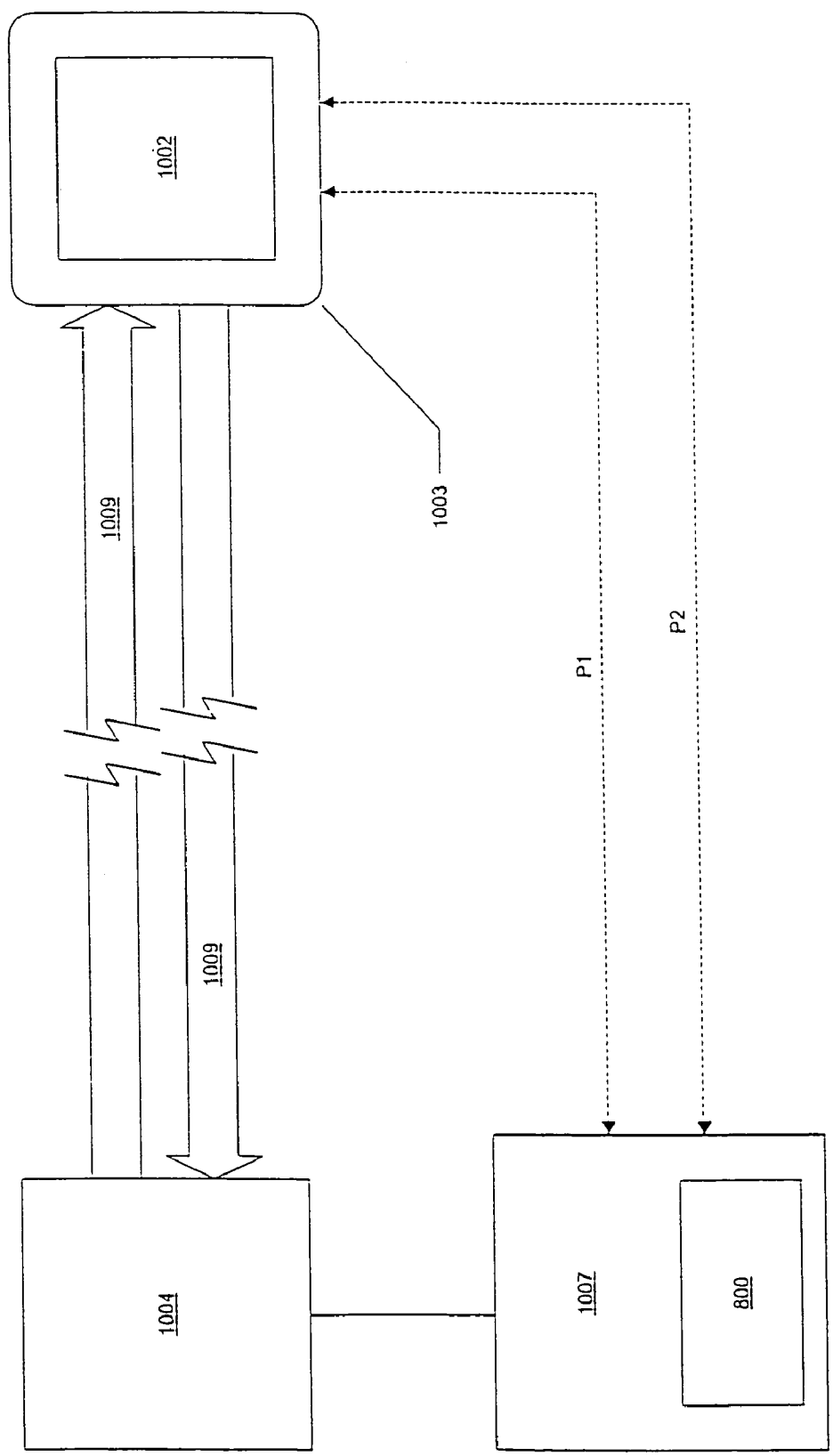
FIG. 10 is a functional block diagram of a second embodiment of a latent thermal conditioning system according to the invention.

Referring now to FIGS. 9 and 10, exemplary embodiments of temperature conditioning apparatus according to the present invention are described. As shown in FIG. 9, a first embodiment of the apparatus 900 comprises an assembly of components 904a-f stacked on a thermal platform 902, wherein each component of the stack provides significant thermal transmission latency, and wherein each may have a different thermal latency. A controller 907 comprising an embedded temperature controller of the type well known in the temperature controller arts and having the algorithm 800 previously described running thereon (via program or flash memory), and thermal conditioning medium 909, are coupled to the platform 902 so as to provide temperature control of the platform 902. At the top of the stack resides the DUT (Device Under Test) 906 of interest. Temperature probes P1 and P2 provide temperature inputs to the controller 907 from the platform 902 and DUT, respectively. The thermal conditioning medium 909 may comprise, for example a refrigerant (e.g., R12 or R114) or liquefied nitrogen or helium in the vapor phase, a liquid phase heat transfer medium, or other medium. Ancillary mechanisms for maintaining the proper state and distributing/returning the conditioning medium 909 as appropriate are also provided, such as for example a compressor and TXV (thermostatic expansion valve) in the case of the aforementioned refrigerant(s). The design and construction of such thermal conditioning devices are well known in the art, and accordingly not described in greater detail herein.

Another exemplary embodiment of the latent temperature control apparatus is shown in FIG. 10, where latency may occur as a result of significant DUT mass and/or significant length of hoses or piping runs 1006, such as when the thermal "engine" (e.g., chiller or thermal fluid conditioning system) 1004 and the controller 1007 are physically disparate from the DUT 1002.

It will also be appreciated that the methodology of the present invention may be readily adapted to a temperature chamber apparatus with associated air circulation/forced air system (including associated ducts and hoses).

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

APPENDIX A

Definitions:

P0=State variable used to initiate I2PC operation

P1=Temperature of primary probe (as adjusted by F17-20)
 [Note: P1 may also be used as a control mode to indicate control by the primary probe only (normal PID control)]

P2=Temperature of secondary probe (as adjusted by F21-F24)

PSP=Programmed setpoint entered by user

CSP=Control (virtual) setpoint generated by algorithm

NSP=New setpoint; state variable that tracks existence of new setpoint for I2PC, and whether the new setpoint is a "ramp up" or a "ramp down" request.
 NSP=0=not a new setpoint or setpoint reached by P2—do not use I2PC
 NSP=1=new setpoint detected—ramp up
 NSP=2=new setpoint detected—ramp down F34=first setup parameter; used as ABS(PSP-P2) multiplier F35=second setup parameter; I2PC overdrive/underdrive amount in degrees Exemplary Program Description:

1. I2PC [Basic I2PC routine for calculating the "unlimited" CSP that will be used for control]:

```
IF
NSP=1 AND (ABS(PSP-P2)*F34+F35)>0    ;temp is programmed
                                      to go up &
                                      calculated adjustment > 0
THEN
CSP=PSP+(ABS(PSP-P2)*F34+F35)         ;move control setpoint
                                      up by adjustment
                                      amount
ELSEIF
NSP=2 AND (ABS(PSP-P2)*F34+F35)>0    ;temp is programmed to
                                      go down & calculated
                                      adjustment > 0
THEN
CSP=PSP-(ABS(PSP-P2)*F34+F35)         ;move control setpoint
                                      down by adjustment
                                      amount.
ELSE
CSP=PSP                               ;control setpoint same as the
                                      programmed setpoint
ENDIF
```

2. New Setpoint Entry [Immediately after entry of a new setpoint in P0 (I2PC) mode]:

```
IF
   P2<PSP        ;indicates request for ramp us
THEN
   Set NSP=1     ;set flag indicating a new "ramp up" setpoint has been
                  entered
ELSEIF
   P2>PSP        ; indicates request for ramp down
THEN
   Set NSP=2     ;set flag indicating a new "ramp down "setpoint has been
                  entered
ELSE
   Set NSP=0     ;set flag indicating no new setpoint for I2PC
ENDIF
```

3. ControlStart [This is the entry point for the I2PC routine for each control cycle]:

```
IF
   NSP=0           ;no I2PC setpoint, or setpoint already
                    satisfied
THEN
   GOTO P1Control  ;branch to normal primary probe control
ENDIF
```

-continued

```
IF NSP=1 AND P2=>PSP    ;I2PC was ramping up & secondary probe
                         achieved or exceeded the programmed
                         setpoint
    OR
NSP=2 AND P2<=PSP       ;I2PC was ramping down & secondary probe
                         achieved or exceeded the programmed
                         setpoint
THEN
    NSP=0
ENDIF
```

Appendix B

Temperature Sensors
Probe1=sensor in platform/liquid conditioner
Probe2=sensor in DUT

| Setup parameters | |
|---|---|
| F40 | Stable band for P2 device |
| F41 | Stable time for P2 device |
| F42 | Averaging interval for P2 device @ stability |
| F43 | Maximum delay awaiting P2 stability |
| F44 | Maximum P1 temperature ramping rate |
| F45 | Minimum P2 temp change required |
| F46 | Maximum delay awaiting P2 temp change |

Process Sequence
    Set setpoint temperature for DUT (DUT_Setpoint)
    :Control_loop_start
    Save P2_start_temp
    Add/remove heat to change platform temperature until setpoint temperature is reached. Constrain heat addition or removal to respect max ramp rate of platform per F44
    Wait for platform to achieve setpoint per settling band parameters
    Start DUT_change_timer
    Wait until either DUT has changed (from DUT_start_temp) by at least F45 degrees, or DUT_change_timer has reached at least F46
    Start DUT_await_stability_timer
    Wait for P2 temperature to stabilize per F40 & F41 or DUT_await_stability_timer has reached at least F43
    Compute P2_average_temp during next F42 time
    Adjust P1 setpoint by difference between current P1 setpoint and P2_average_temp
    Iteratively repeat process from :Control_loop_start

What is claimed is:

1. A method of achieving a desired temperature of a first object using a second object, said first and second objects being in direct or indirect physical contact, said second object being adapted both to provide heating and cooling, the method comprising:
    controlling and monitoring the temperature of said second object to achieve a first temperature thereof;
    observing at least one event associated with said first object after said second object has achieved said first temperature; and
    subsequently controlling the temperature of said second object based at least in part on said at least one event.

2. The method of claim 1, wherein said act of subsequently controlling the temperature of said second object comprises causing said second object to achieve said desired temperature.

3. The method of claim 1, wherein said act of observing comprises:
    determining a change in the temperature of at least a portion of said first object; and
    subsequently identifying that said temperature of said at least portion has stabilized over a period of time.

4. The method of claim 1, wherein said at least one event comprises stabilization of the temperature of said first object, and said act of subsequently controlling the temperature of said second object comprises adjusting the output of a temperature controller in relation to the difference between said first temperature and the temperature at which said first object has stabilized.

5. A method of latently achieving a desired temperature of a DUT using a temperature conditioning element, said DUT and temperature conditioning element being able to pass thermal energy therebetween, the method comprising:
    monitoring the temperature of said conditioning element using a first temperature probe;
    controlling the temperature of said conditioning element based at least in part on said act of monitoring, said controlling achieving and maintaining for at a period of time a target temperature of said element;
    observing, using a second temperature probe, a temperature change event and a subsequent temperature stabilization event within said DUT after said conditioning element has substantially achieved said target temperature; and
    subsequently controlling the temperature of said conditioning element for at least a period of time based at least in part on said change and stabilization events.

6. The method of claim 5, wherein said act of subsequently controlling comprises evaluating, after said change and stabilization events have been observed, the difference between the temperatures reported by said first and second probes.

7. The method of claim 6, wherein said act of subsequently controlling further comprises adjusting the temperature of said conditioning element based at least in part on said act of evaluating.

8. The method of claim 5, wherein said act of subsequently controlling comprises controlling using a PID loop.

9. A method of controlling the temperature of a conditioning device, comprising:
    generating first signals from a first temperature probe, said first signals related to the temperature of at least a portion of a DUT;
    generating second signals from a second temperature probe, said second signals related to the temperature of at least a portion of said conditioning device;
    establishing a first temperature for said conditioning device;
    identifying at least one change in said DUT thereafter;
    identifying at least one stabilization event in said DUT thereafter; and
    adjusting the temperature of said conditioning device based at least in part on said first and second signals and said acts of identifying.

10. The method of claim 9, wherein said adjusting the temperature of said conditioning device further comprises maintaining for at least a period of time a target temperature of said conditioning device.

11. The method of claim 9, wherein at least one of said acts of identifying comprises identifying a change or event based on a parameter other than temperature.

12. The method of claim 11, wherein said parameter comprises DUT electrical conductivity.

13. The method of claim 11, wherein said parameter comprises DUT capacitance.

14. The method of claim 11, wherein said parameter comprises DUT frequency response.

15. The method of claim 11, wherein said parameter comprises a mechanical property associated with said DUT.

16. A method of controlling the temperature of a conditioning device, comprising:
generating first signals from a first probe, said first signals related to a parameter of a DUT;
generating second signals from a second temperature probe, said second signals related to the temperature of at least a portion of said conditioning device;
establishing a first temperature for said conditioning device;
identifying at least one change in said DUT thereafter;
identifying at least one stabilization event in said DUT thereafter; and
adjusting the temperature of said conditioning device based at least in part on said first and second signals and said acts of identifying.

17. The method of claim 16, wherein at least one of said acts of identifying comprises identifying a change or event based on a parameter other than temperature.

18. The method of claim 17, wherein said parameter comprises DUT electrical conductivity.

19. The method of claim 17, wherein said parameter comprises DUT capacitance.

20. The method of claim 17, wherein said parameter comprises DUT frequency response.

21. The method of claim 17, wherein said parameter comprises a mechanical property associated with said DUT.

22. A method of latently achieving a desired temperature of a DUT using a temperature conditioning element, said DUT and temperature conditioning element being in direct or indirect contact with one another, the method comprising:
monitoring the temperature of said conditioning element using a first sensor;
controlling the temperature of said conditioning element based at least in part on said act of monitoring, said controlling maintaining for at a period of time a target temperature of said element;
observing, using a second sensor, a temperature change event and a subsequent temperature stabilization event within said DUT after said conditioning element has substantially achieved said target temperature; and
subsequently controlling the temperature of said conditioning element for at least a period of time based at least in part on said change and stabilization events.

23. The method of claim 22, wherein said act of subsequently controlling comprises evaluating, after said change and stabilization events have been observed, the difference between the temperatures reported by said first and second sensors.

24. The method of claim 23, wherein said act of subsequently controlling further comprises adjusting the temperature of said conditioning element based at least in part on said act of evaluating.

25. The method of claim 22, wherein said act of subsequently controlling comprises controlling using a PID loop.

26. A method of controlling the temperature of a first object using a second object, said first and second objects being in direct or indirect contact, said second object being adapted both to provide heating and cooling, the method comprising:
controlling and monitoring the temperature of said second object to achieve a first temperature thereof;
detecting at least one event associated with said first object after said second object has achieved said first temperature; and
subsequently controlling the temperature of said second object based at least in part on said detecting.

27. The method of claim 26, wherein said act of subsequently controlling the temperature of said second object comprises causing said second object to achieve a desired temperature.

28. The method of claim 26, wherein said act of detecting comprises:
determining a change in the temperature of at least a portion of said first object; and
subsequently identifying that said temperature of said at least portion has stabilized over a period of time.

29. The method of claim 26, wherein said at least one event comprises stabilization of the temperature of said first object, and said act of subsequently controlling the temperature of said second object comprises adjusting the output of a temperature controller in relation to the difference between said first temperature and the temperature at which said first object has stabilized.

30. A method of latent temperature control of a DUT using a temperature conditioning element, said DUT and temperature conditioning element being able to pass thermal energy therebetween, the method comprising:
monitoring the temperature of said conditioning element using a first temperature sensor;
controlling the temperature of said conditioning element based at least in part on said act of monitoring, said controlling achieving and maintaining for at a period of time a target temperature of said element;
detecting, using a second temperature sensor, a temperature change event and a subsequent temperature stabilization event within said DUT after said conditioning element has substantially achieved said target temperature; and
subsequently controlling the temperature of said conditioning element for at least a period of time based at least in part on said change and stabilization events.

31. The method of claim 30, wherein said act of subsequently controlling comprises controlling using a PID loop.

32. A method of latently achieving a desired temperature of a DUT using a temperature conditioner, said DUT and temperature conditioner being in direct or indirect contact with one another, the method comprising:
monitoring the temperature of said conditioner using at least a first sensor;
controlling the temperature of said conditioner based at least in part on said act of monitoring, said controlling maintaining for at a period of time a target temperature of said element;
detecting, using a second sensor, a temperature change event and a subsequent temperature stabilization event within said DUT after said conditioner has substantially achieved said target temperature; and
subsequently controlling the temperature of said conditioner for at least a period of time based at least in part on said change and stabilization events.

33. The method of claim 32, wherein said act of subsequently controlling comprises evaluating, after said change and stabilization events have been detected, the difference between the temperatures reported by said first and second sensors; and wherein said act of subsequently controlling further comprises adjusting the temperature of said conditioner based at least in part on said act of evaluating.

34. A method of controlling the temperature of a first object using a second object, said first and second objects being in direct or indirect contact, said second object being adapted both to provide heating and cooling, the method comprising:

- a step for controlling and monitoring the temperature of said second object to achieve a first temperature thereof;
- a step for detecting at least one event associated with said first object after said second object has achieved said first temperature; and
- subsequently controlling the temperature of said second object based at least in part on said detecting.

35. A method of latent temperature control of a DUT using means for temperature conditioning, said DUT and means for temperature conditioning being able to pass thermal energy therebetween, the method comprising:

- monitoring the temperature of said means for conditioning using a first temperature sensing means;
- controlling the temperature of said means for conditioning based at least in part on said act of monitoring, said controlling achieving and maintaining for at a period of time a target temperature of said means for conditioning;
- detecting, using a second temperature sensing means, a temperature change event and a subsequent temperature stabilization event within said DUT after said means for conditioning has substantially achieved said target temperature; and
- subsequently controlling the temperature of said means for conditioning for at least a period of time based at least in part on said change and stabilization events.

* * * * *